(12) United States Patent
Rabinovich et al.

(10) Patent No.: US 8,478,530 B2
(45) Date of Patent: Jul. 2, 2013

(54) USING MULTICOMPONENT INDUCTION DATA TO IDENTIFY DRILLING INDUCED FRACTURES WHILE DRILLING

(75) Inventors: Michael B. Rabinovich, Houston, TX (US); Daniel T. Georgi, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 684 days.

(21) Appl. No.: 12/497,024

(22) Filed: Jul. 2, 2009

(65) Prior Publication Data

US 2010/0004866 A1    Jan. 7, 2010

Related U.S. Application Data

(60) Provisional application No. 61/078,664, filed on Jul. 7, 2008.

(51) Int. Cl.
*G01V 1/40* (2006.01)
(52) U.S. Cl.
USPC ............................................................ 702/7
(58) Field of Classification Search
USPC ................. 702/6, 7, 9, 38, 75, 150, 151, 153, 702/183, 185
See application file for complete search history.

(56) References Cited

U.S. PATENT DOCUMENTS

| | | | |
|---|---|---|---|
| 2005/0256645 A1* | 11/2005 | Rabinovich et al. | 702/7 |
| 2008/0062814 A1* | 3/2008 | Prioul et al. | 367/31 |
| 2008/0319675 A1* | 12/2008 | Sayers | 702/11 |
| 2011/0091078 A1* | 4/2011 | Kherroubi et al. | 382/109 |

OTHER PUBLICATIONS

D. Georgi, et al. "Biaxial Anisotropy: Its Occurrence and Measurement with Multi-component Induction Tools", SPE 114739. 2008 SPE Annual Technical Conference and Exhibition held in Denver, Colorado, USA Sep. 21-24, 2008.
R. Guha, et al. "Integrating Multi-Sensor Acoustic and Resistivity Data for Improved Formation Evaluation in the Presence of Drilling Induced Fractures". SPWLA 47th Annual Logging Symposium, Jun. 4-7, 2006.
B. Kriegshauser, et al. "A New Multicomponent Induction Logging Tool to Resolve Anisotropic Formations". SPWLA 41st Annual Logging Symposium, Jun. 4-7, 2000.
M. Rabinovich, et al. "Effect of Fractures on Multi-Component and Multi-Array Induction Logs". SPWLA 45th Annual Logging Symposium, Jun. 6-9, 2004.

* cited by examiner

*Primary Examiner* — Mohamed Charioui
(74) *Attorney, Agent, or Firm* — Cantor Colburn LLP

(57) ABSTRACT

A method for identifying drilling induced fractures while drilling a wellbore into a formation is disclosed. The method includes: obtaining multi-component induction data collected by a drill string including a multi-component induction tool; processing the data to estimate values for principal components; and identifying drilling induced fractures from the principal components. An instrument and a computer program product are disclosed.

11 Claims, 18 Drawing Sheets

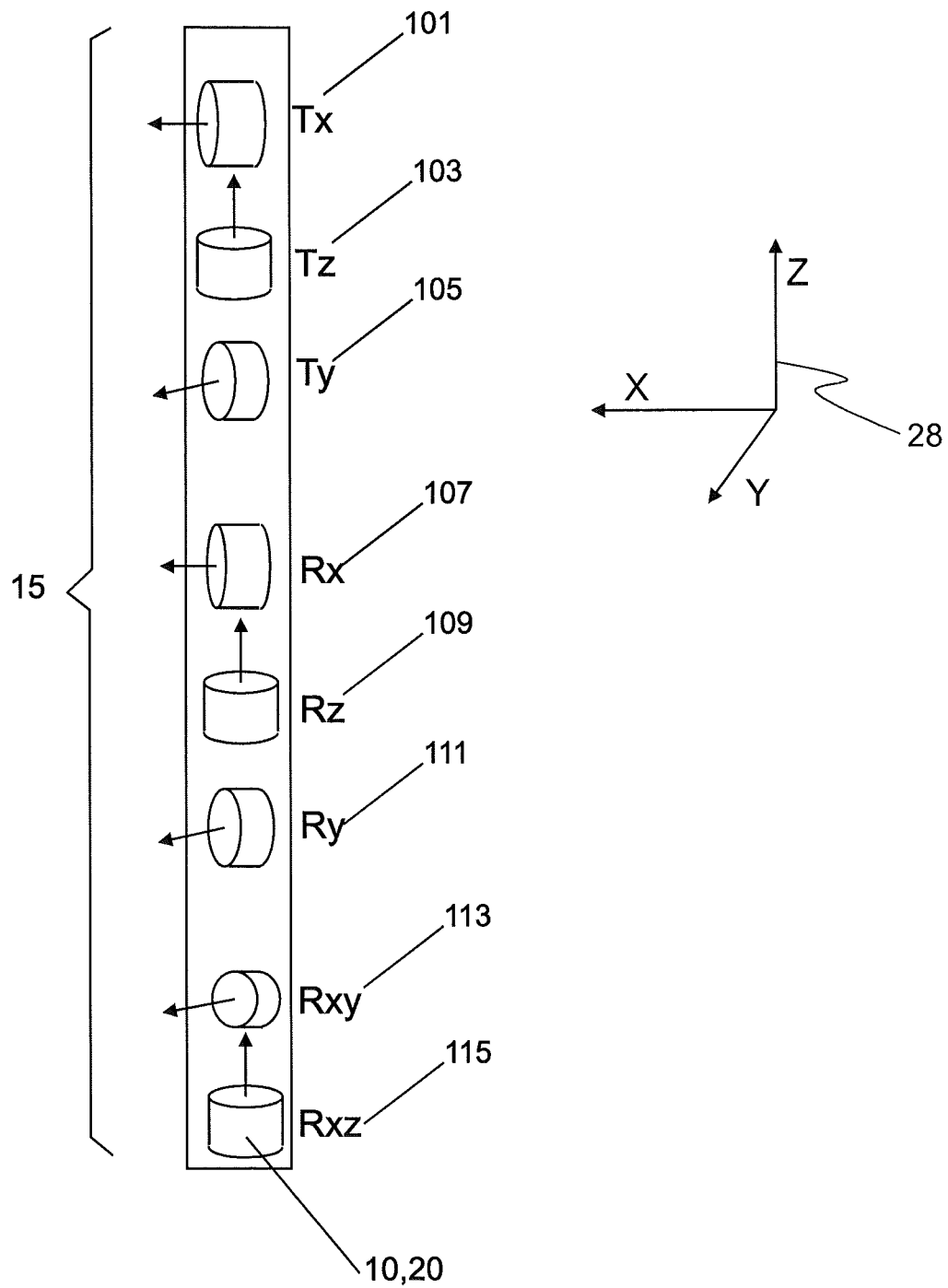

Effect (resistivity decrease) most pronounced on X and Z directions

Effect (resistivity increase) most pronounced on Y direction

FIG. 8

| Current direction | Resistor circuit | Equation | Dominant resistivity effects |
|---|---|---|---|
| x | Formation / Fracture (parallel) | $R_x = \left((1-\phi_f)\cdot R_{form,h}^{-1} + \phi_f \cdot R_{mf}^{-1}\right)^{-1}$ | Water based → decreases $R_x$<br>Oil based → minor influence on $R_x$ |
| y | Formation Fracture (series) | $R_y = (1-\phi_f)\cdot R_{form,h}^{-1} + \phi_f \cdot R_{mf}$ | Water based → minor influence on $R_y$<br>Oil based → strong increase on $R_y$ |
| z | Formation / Fracture (parallel) | $R_z = \left((1-\phi_f)\cdot R_{form,v}^{-1} + \phi_f \cdot R_{mf}^{-1}\right)^{-1}$ | Water based → decrease on $R_z$<br>Oil based → minimal influence on $R_z$ |

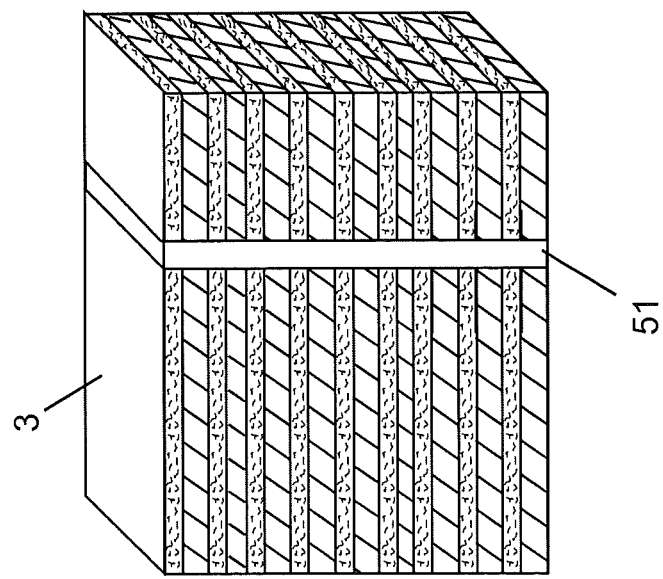
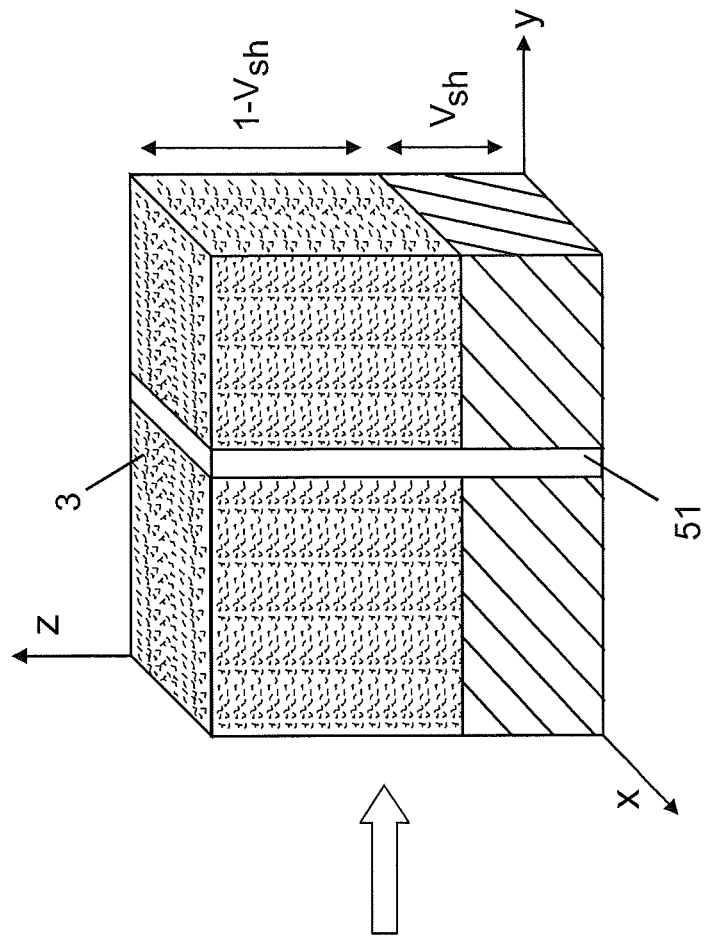
FIG. 9

FIG. 18
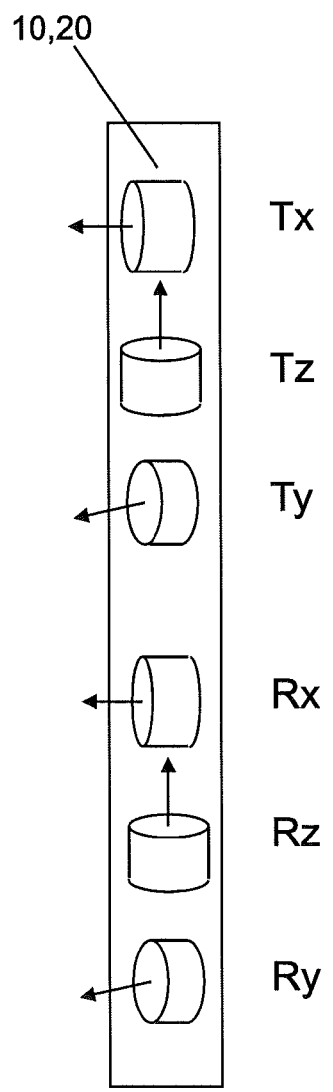
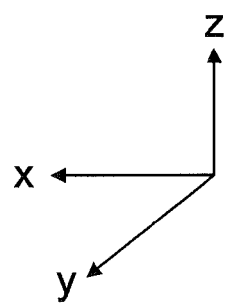
| Tx | Ty | Tz |
|---|---|---|
| Hxx | Hyx | Hzx |
| Hxy | Hyy | Hzy |
| Hxz | Hyz | Hzz |

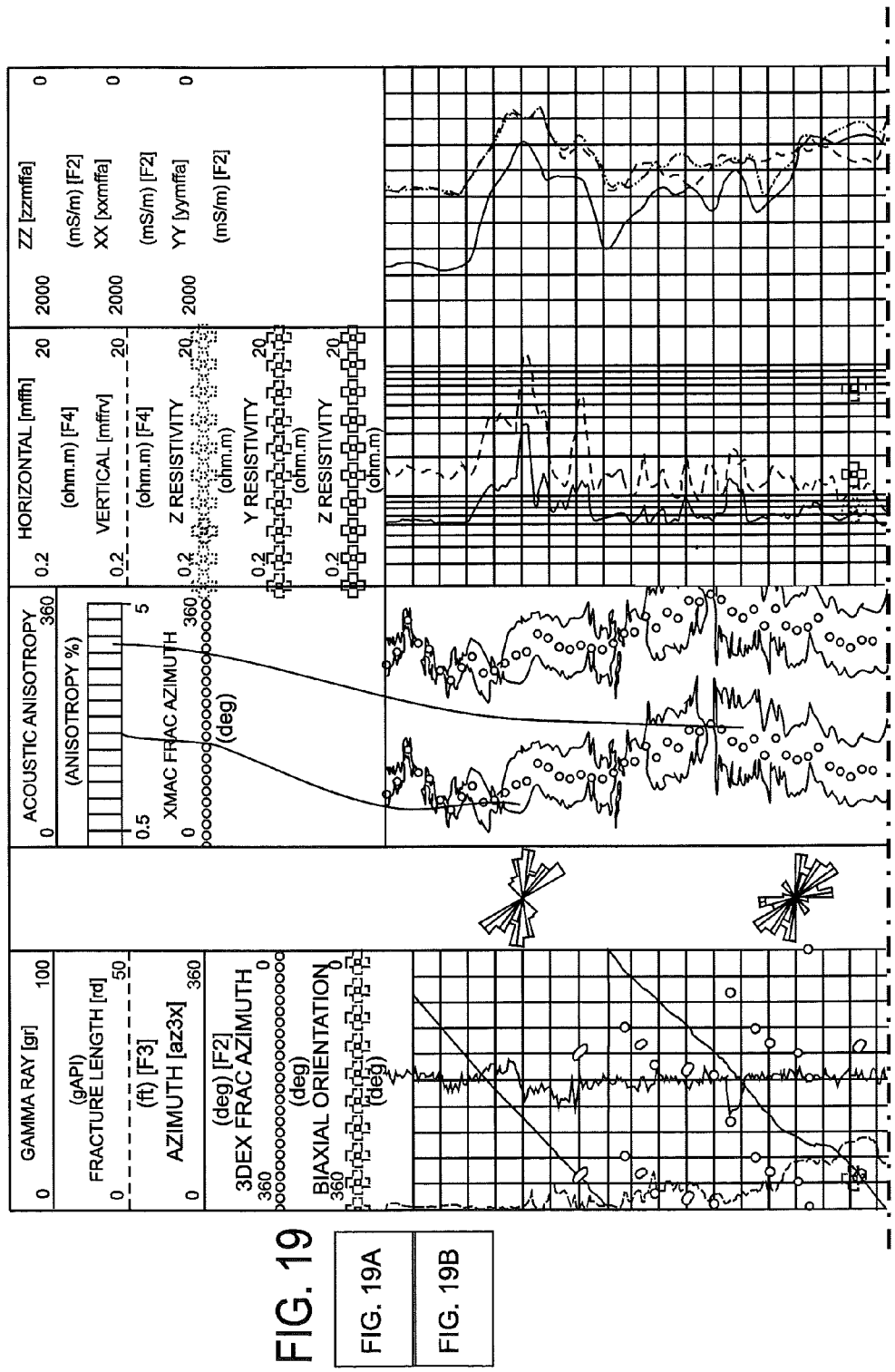

USING MULTICOMPONENT INDUCTION DATA TO IDENTIFY DRILLING INDUCED FRACTURES WHILE DRILLING

CROSS REFERENCE TO RELATED APPLICATION

This application is a Non-Provisional application of U.S. Ser. No. 61/078,664, filed Jul. 7, 2008, the contents of which are incorporated by reference herein in their entirety.

BACKGROUND OF THE INVENTION

1. Field of the Invention

The invention is related generally to oil field exploration and in particular to use of multi-component induction measurements for identifying fractures in surrounding formations.

2. Description of the Related Art

Electromagnetic induction and wave propagation logging tools are commonly used for determination of electrical properties of formations surrounding a borehole. These logging tools give measurements of apparent resistivity (or conductivity) of the formation that, when properly interpreted, are diagnostic of the petrophysical and other properties of the formation and the fluids therein.

In thinly laminated sand-shale sequences or shaly-sand formations, the formation electrical anisotropy becomes important in determining the hydrocarbon saturation from the resistivity measurements. Due to physical complexities of the formation, determining the electrical anisotropy can be complicated.

For example, intrinsic and macroscopic properties may give rise to anisotropy (i.e., directional dependence). Fractures may also have a substantial effect. In some instances, fractures occur as a result of drilling processes. Accordingly, fracturing as a result of drilling can affect other measurements. Unfortunately, techniques presently available do not adequately provide for characterization of anisotropy while drilling.

When drilling a well it is critical to keep the pressure in the well bore resulting from the weight of the drilling mud below the formation fracture pressure. If the pressure in the well does exceed the formation fracture pressure then the well will fracture and the drilling mud will flow out of the well. Once the drilling mud flows out of the well shallower formations may flow high pressure water or hydrocarbons back to the surface and the well will blow out.

Generally, principles of geomechanics are used to determine the appropriate mud weight to prevent high pressure formation fluids from flowing to the surface (minimum mud weight) as well as a maximum mud weight to keep from fracturing the formation. Unfortunately the actual mud weight includes both static and dynamic components. The static mud weigh is controlled by weighting agents in the mud and suspended cuttings. The dynamic component is due to the movement of the drilling mud and drill pipe (both rotation and upward and downward motion) which can increase the apparent mud weight above the static mud weight.

It is the equivalent circulating density of the mud which is critical. There are well known rules for calculating the ECD, but these may not be accurate and the strength of the formation is not know precisely. Hence during drilling the formation may fracture (drilling induced fractures). These drilling induced fracture should be avoided. Knowing in real time that the formation is beginning to fracture would allow one to reduce the mud weight and thus avoid "fraccing" (i.e., factoring) the well and a subsequent potential blow out.

There is a need for advanced methods for providing determinations of formation anisotropy. Preferably, the methods should consistently provide accurate and reliable data, be computationally efficient and useful for implementation while drilling a wellbore. Ultimately, the methods provide users with a capability to one to reduce the mud weight and avoid fraccing the well and experiencing a blow out.

BRIEF SUMMARY OF THE INVENTION

The above-discussed and other features and advantages of the present invention will be appreciated and understood by those skilled in the art from the following detailed description and drawings.

In one embodiment, the invention includes a method for identifying drilling induced fractures while drilling a wellbore into a formation, the method including: obtaining multi-component induction data collected by a drill string including a multi-component induction tool; processing the data to estimate values for principal components; and identifying drilling induced fractures from the principal components.

In another embodiment, the invention includes an instrument for identifying drilling induced fractures in a formation surrounding a wellbore, the instrument including: at least one set of coils adapted for generating a field in the formation, the set further adapted for obtaining multi-component induction data from the field; and a processor equipped to process data to estimate values for principal components; and identify a drilling induced fracture from the principal components.

In a further embodiment, the invention includes a computer program product stored on computer readable media, the product including computer executable instructions for identifying a fracture in a subterranean formation, the instructions including instructions for: receiving multi-component induction data collected by a multi-component induction tool; processing the data to estimate values for principal components; and identifying drilling induced fractures from the principal components.

BRIEF DESCRIPTION OF THE DRAWINGS

Referring now to the drawings wherein like elements are numbered alike in the several Figures:

FIG. 3 depicts aspects of a sensor for a well logging instrument;

FIG. 8 presents electrical equivalents for combinations of the formation and fractures in the X, Y and Z directions;

FIG. 9 provides a general model for a fractured laminated sand-shale formation;

FIG. 18 depicts tensorial relationships for the well logging instrument; and FIG. 19A and FIG. 19B depict an exemplary well log displaying results based on the teachings herein.

DETAILED DESCRIPTION OF THE INVENTION

Figure 1:
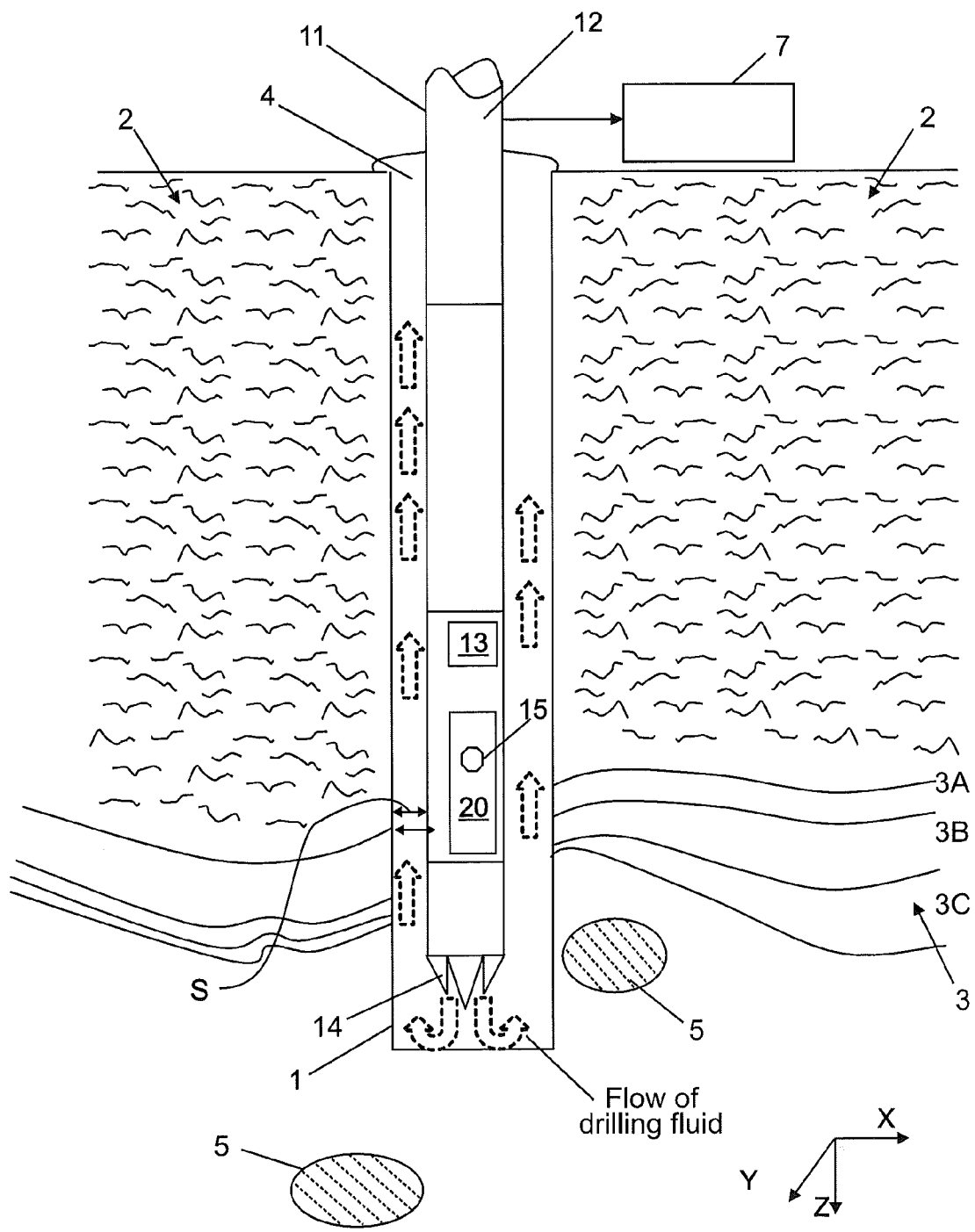
FIG. 1 illustrates an exemplary embodiment of a drill string that includes a logging instrument.

Refer now to FIG. 1 where aspects of an apparatus for drilling a wellbore 1 (also referred to as a "borehole") are shown. As a matter of convention, a depth of the wellbore 1 is described along a Z-axis, while a cross-section is provided on a plane described by an X-axis and a Y-axis.

In this example, the wellbore 1 is drilled into the Earth 2 using a drill string 11 driven by a drilling rig (not shown) which, among other things, provides rotational energy and downward force. The wellbore 1 generally traverses sub-surface materials, which may include various formations 3 (shown as formations 3A, 3B, 3C). One skilled in the art will recognize that the various geologic features as may be encountered in a subsurface environment may be referred to as "formations," and that the array of materials down the borehole (i.e., downhole) may be referred to as "sub-surface materials." That is, the formations 3 are formed of sub-surface materials. Accordingly, as used herein, it should be considered that while the term "formation" generally refers to geologic formations, and "sub-surface material," includes any materials, and may include materials such as fluids, gases, liquids, and the like.

The drill string 11 includes lengths of drill pipe 12 which drive a drill bit 14. In this example, the drill bit 14 also provides a flow of a drilling fluid 4, such as drilling mud. The drilling fluid 4 is often pumped to the drill bit 14 through the drill pipe 12, where the fluid exits into the wellbore 1. This results in an upward flow of drilling fluid 4 within the wellbore 1. The upward flow generally cools the drill string 11 and components thereof, carries away cuttings from the drill bit 14 and prevents blowout of pressurized hydrocarbons 5.

The drilling fluid 4 (also referred to as "drilling mud") generally includes a mixture of liquids such as water, drilling fluid, mud, oil, gases, and formation fluids as may be indigenous to the surroundings. Although drilling fluid 4 may be introduced for drilling operations, use or the presence of the drilling fluid 4 is neither required for nor necessarily excluded from well logging operations. Generally, a layer of materials will exist between an outer surface of the drill string 11 and a wall of the wellbore 1. This layer is referred to as a "standoff layer," and includes a thickness, referred to as "standoff, S."

The drill string 11 generally includes equipment for performing "measuring while drilling" (MWD), also referred to as "logging while drilling" (LWD). Performing MWD or LWD generally calls for operation of a logging instrument 20 that in incorporated into the drill string 11 and designed for operation while drilling. Generally, the MWD logging instrument 20 is coupled to or includes an electronics package which is also on board the drill string 11, and therefore referred to as "downhole electronics 13."

Generally, the downhole electronics 13 provides for at least one of operational control and data analysis. Among other things, the downhole electronics 13 receives input from at least one on-board sensor 15. Accordingly, the downhole electronics 13 may include, without limitation, a power supply, a transformer, a battery, a processor, memory, storage, at least one communications interface and the like. The electronics unit may include a signal generator and power amplifiers (not shown), which cause alternating currents of selected frequencies to flow through transmitter coils in the sensor 15.

In some embodiments, the electronics unit 13 includes receiver circuits (not shown) for detecting voltages induced in receiver coils in the sensor 15, and circuits for processing these received voltages (not shown) into signals representative of the conductivities of various layers 3A-3C of the formations 3. As a matter of convenience, the electronics unit 13 may include signal telemetry to transmit conductivity related signals to the surface of the Earth 2 further processing. Alternatively, the electronics unit 13 may store data in an appropriate recording device (not shown) for processing after the instrument 20 is withdrawn from the wellbore 1.

Often, the logging instrument 20 and the downhole electronics 13 are coupled to topside equipment 7. The topside equipment 7 may be included to further control operations, provide greater analysis capabilities as well as data logging and the like. A communications channel (not shown) may provide for communications to the topside equipment 7, and may operate via pulsed mud, wired pipe, and other technologies as are known in the art.

Generally, data from the logging instrument 20 provide users with enhanced capabilities. For example, data made available from MWD evolutions may be useful as inputs to geosteering of the drill string 11 and the like.

Figure 2:
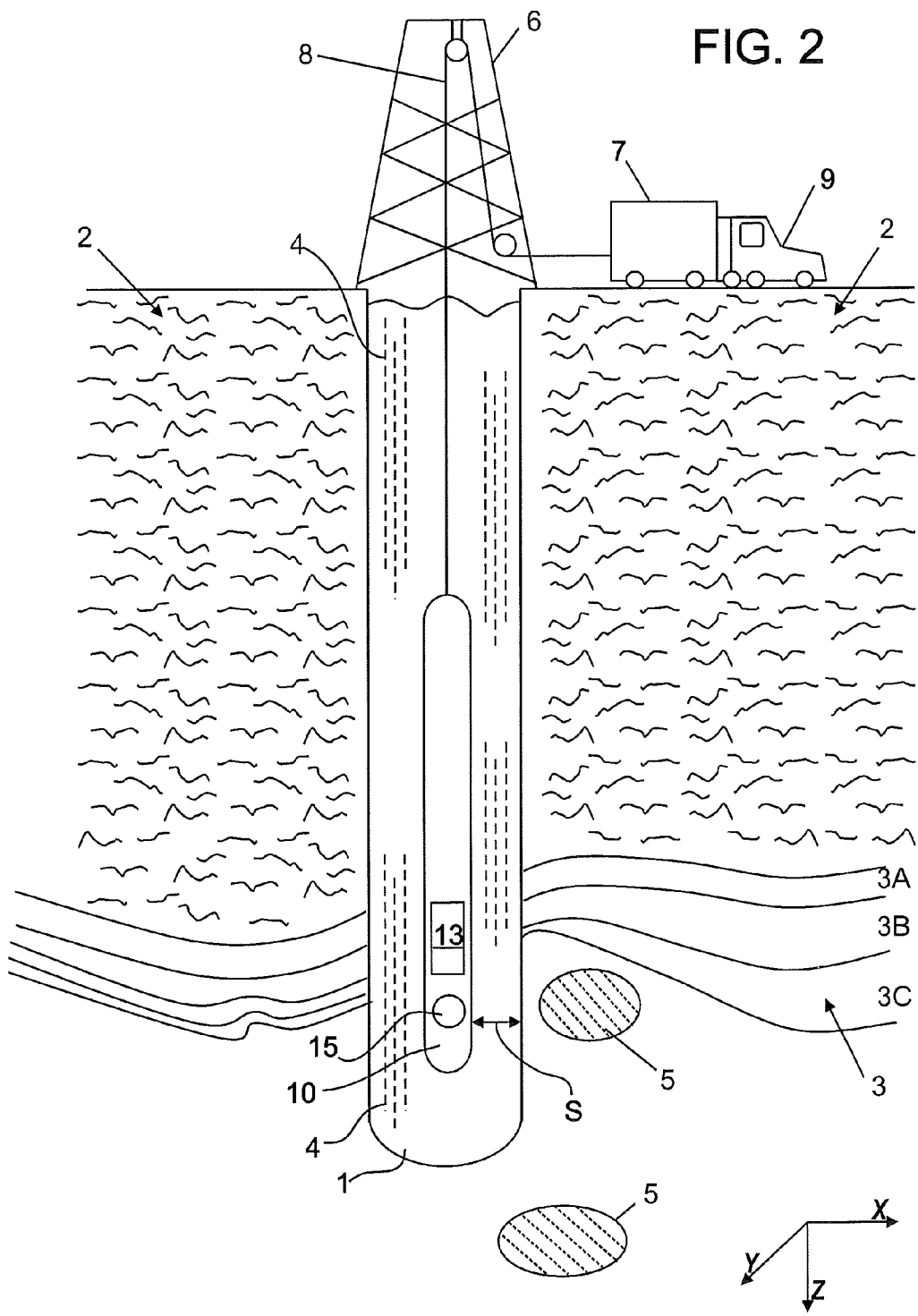
FIG. 2 illustrates an exemplary embodiment for well logging with an instrument deployed by a wireline.

Referring now to FIG. 2, an exemplary well logging instrument 10 (also referred to as a "tool") for wireline logging is shown disposed in a wellbore 1 (also referred to as a "borehole"). As a matter of convention, a depth of the wellbore 1 is described along a Z-axis, while a cross-section is provided on a plane described by an X-axis and a Y-axis. Prior to well logging with the logging instrument 10, the wellbore 1 is drilled into the Earth 2 using a drilling rig, such as one shown in FIG. 1.

In some embodiments, the wellbore 1 has been filled, at least to some extent, with drilling fluid 4. The drilling fluid 4 (also referred to as "drilling mud") generally includes a mixture of liquids such as water, drilling fluid, mud, oil, gases, and formation fluids as may be indigenous to the surroundings. Although drilling fluid 4 may be introduced for drilling operations, use or the presence of the drilling fluid 4 is neither required for nor necessarily excluded from well logging operations. Generally, a layer of materials will exist between an outer surface of the logging instrument 10 and a wall of the wellbore 1. This layer is referred to as a "standoff layer," and includes a thickness, referred to as "standoff, S."

The logging instrument 10 is lowered into the wellbore 1 using a wireline 8 deployed by a derrick 6 or similar equipment. Generally, the wireline 8 includes suspension apparatus, such as a load bearing cable, as well as other apparatus. The other apparatus may include a power supply, a communications link (such as wired or optical) and other such equipment. Generally, the wireline 8 is conveyed from a service truck 9 or other similar apparatus (such as a service station, a base station, etc, . . . ). Often, the wireline 8 is coupled to topside equipment 7. The topside equipment 7 may provide power to the logging instrument 10, as well as provide computing and processing capabilities for at least one of control of operations and analysis of data.

Generally, the logging instrument 10 includes apparatus for performing measurements "downhole" or in the wellbore 1. Such apparatus include, for example, at least one on-board sensor 15. Exemplary sensors 15 may include a set of coils to provide an induction logging instrument. The sensors 15 may communicate with the downhole electronics 13. The measurements and other sequences as may be performed using the logging instrument 10 are generally performed to ascertain and qualify a presence of hydrocarbons 5.

One skilled in the art will recognize that certain aspects of the teachings herein may be applied in either one or both of embodiments that include logging while drilling (LWD/MWD) and wireline logging. Accordingly, the invention disclosed herein is not limited to embodiments presented, and may include any type of subterranean measurement apparatus now known or later devised and as deemed practicable. In short, the well logging tool 10, 20 may includes adaptations as may be necessary to provide for operation during various deployments, including during drilling or after a drilling process has been undertaken or completed.

Referring to FIG. 3, one embodiment of the sensor 15 that includes a set of coils further including transmitter coils and receiver coils as shown. Three transmitter coils 101, 103 and 105, referred to as the $T_x$, $T_z$, and $T_y$ transmitters are substantially orthogonally oriented (the z-axis being along the longitudinal axis of the tool, as depicted in the legend). The transmitter coils 101, 103 and 105 generate magnetic fields for obtaining measurements in the formations 3 surrounding the wellbore 1.

Corresponding to the transmitter coils 101, 103 and 105 are receiver coils 107, 109 and 111, referred to as the $R_x$, $R_z$, and $R_y$ receivers, respectively. The receiver coils 107, 109 and 111 measure aspects of the corresponding magnetic fields, and are also are substantially orthogonally oriented to each other. Additional receiver coils 113 and 115 may be included and measure two cross-components $H_{xy}$, and $H_{xz}$ of the magnetic field (H) produced by the x-component transmitter.

As used herein, the well logging tool 10, 20 may also be referred to as an "instrument 10, 20" or a "multi-component induction tool 10, 20," and by reference numbers "10", "20" or "10, 20" without implying any particular limitation of apparatus for deploying the technology.

Other embodiments of the tool 10 may include those, for example, with side-by-side transmitter and receiver coils and those having other arrangements of transmitters and receivers. Varying number of coils may be used. Therefore, it should be recognized this FIG. 3 depicts one embodiment of aspects of the well logging tool 10, 20, and is not limiting thereof. For example, in other embodiments, the additional coils 113, 115 are not included. Further examples include embodiments having transmitter coils and receiver coils with other or varying orientations.

As discussed herein, reference to the tool 10, 20 and aspects thereof generally refer to the exemplary and non-limiting embodiment. More information regarding the tool 10, 20 may be had by turning to the paper "A New Multicomponent Induction Logging Tool to Resolve Anisotropic Formations" by Kriegshäuser, et al, SPWLA 41$^{st}$ Annual Logging Symposium, Jun. 4-7, 2000, the disclosure of which is incorporated by reference herein in its entirety.

As discussed herein, and for convention, there are four coordinate systems involved in the processing of multi-component induction logging data. The four coordinate systems include one for each of the Earth 2, the formation 3, the tool 10 and the coils 15. In typical embodiments, and by convention herein, the Earth 2 coordinate system has a z-axis Z in the direction of gravity, an x-axis X pointing to the magnetic North, and a y-axis Y in the direction of magnetic East. The other three coordinate systems are defined relative to the earth coordinate system 28, depicted in FIG. 3A.

Figure 4A:
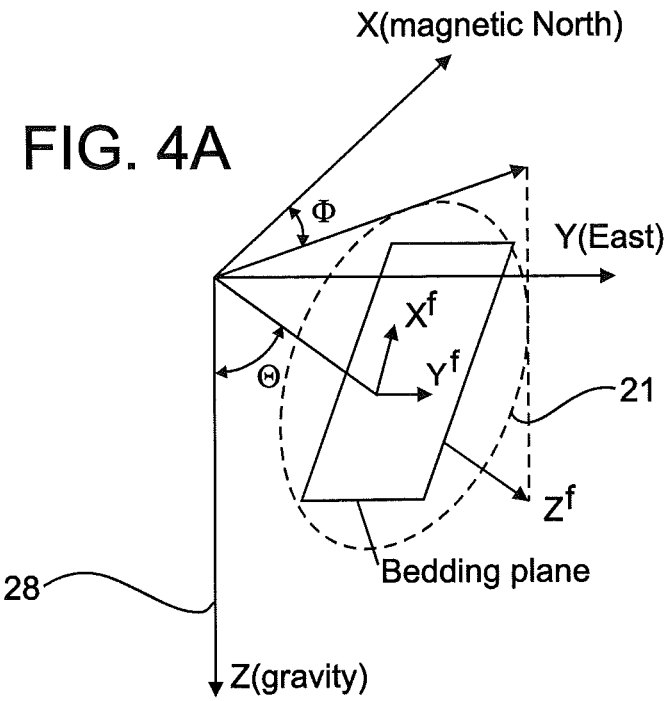
FIG. 4A and FIG. 4B, collectively referred to herein as FIG. 4, depict an Earth coordinate system with a formation coordinate system and the Earth coordinate system with a tool coordinate system.
Figure 4B:
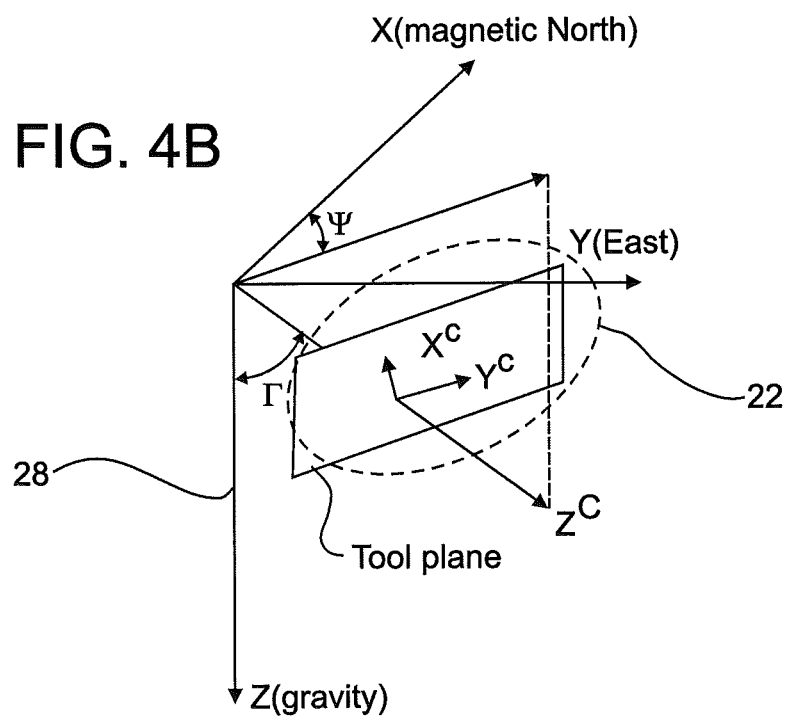

Referring to FIG. 3A, the Earth coordinate system 28 is shown, with the axes as described in the preceding paragraph. The formation coordinate system 21 is also depicted, and shown relative to the earth coordinate system 28. An z-axis $Z^f$ of the formation coordinate system 21 is normal to a bedding plane, while an x-axis $X^f$ and a y-axis $Y^f$ are on the bedding plane, each of the axes ($Z^f$, $X^f$, $Y^f$) being orthogonally oriented. Two formation angles, depicted as a formation dip angle (θ') and a formation azimuth angle (Φ) describe a relationship between the Earth coordinate system 28 and the formation coordinate system 21. Typically, the formation dip angle (θ') and the formation azimuth angle (Φ) are determined by use of inversion processing. The tool coordinate system is depicted in FIG. 4B.

Referring to FIG. 3B, a z-axis $Z^t$ of the tool coordinate system 22 describes the trajectory of the wellbore 1 and is normal to a tool plane. The x-axis $X^t$ and the y-axis $Y^t$ of the tool coordinate system 22 are on the tool plane, each of the axes ($Z^t$, $X^t$, $Y^t$) being orthogonally oriented. The relation of the tool coordinate system 22 to the Earth coordinate system 28 is described by a tool dip angle (Ψ) and a tool azimuth angle (Γ).

Figure 5:
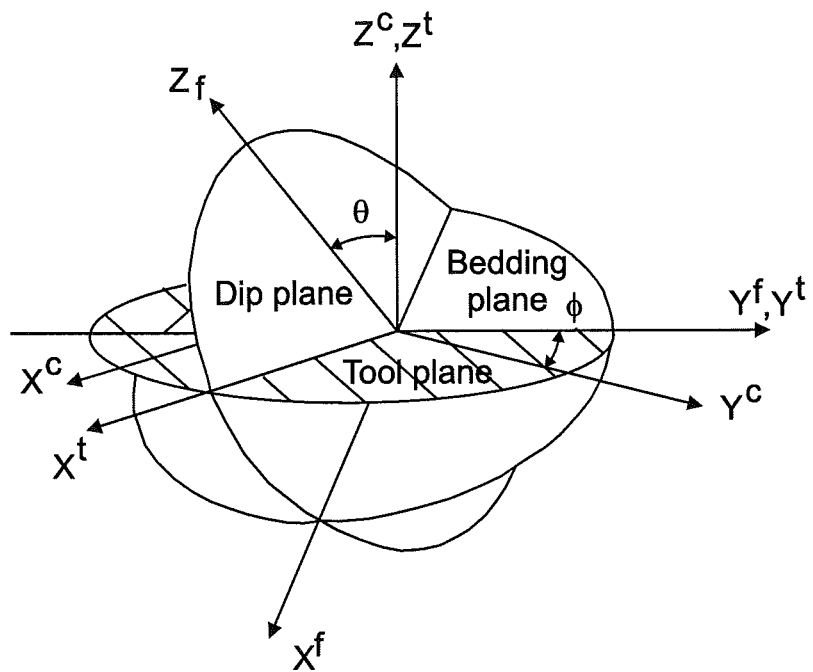
FIG. 5 depicts a combination of the coordinate systems.

A combination of coordinate systems is depicted in FIG. 5. More specifically, the formation coordinate system 21, the tool coordinate system 22 and a coil coordinate system 23 are depicted in relation to each other. Referring to FIG. 5, a dip plane is also shown. The dip plane is described by the coil coordinate system 23, and includes an x-axis $X^c$, a y-axis $Y^c$ and a z-axis $Z^c$. The z-axis $Z^c$ of the coil coordinate system 23 shares the same z-axis $Z^t$ as the tool coordinate system 22, while the y-axis $Y^c$ of the coil coordinate system 23 is offset from the y-axis $Y^f$ of the formation coordinate system 21 by the formation azimuth angle (Φ). A relative tool rotation angle (φ) (not shown in FIG. 5) is described by the x-axis $X^c$ for the coil coordinate system 23, with respect to the high side of the wellbore 1.

In operation, the tool 10 measures co-axial and co-planer components called main components, and also measures cross-components. These measurements provide information to determine, among other things, resistivity and anisotropy of the formation 3. With this information, other salient information may be obtained or derived. For example, with tool orientation data, the formation dip angle (θ') and the formation azimuth angle (Φ) can be obtained. As disclosed herein, algorithms based on and operational within neural networks can be used advantageously to check data quality and determine the formation dip angle (θ') and the formation azimuth angle (Φ) in real-time, or near real-time.

As used herein generation of data in "real-time" is taken to mean generation of data at a rate that is useful or adequate for making decisions during or concurrent with processes such as production, experimentation, verification, and other types of surveys or uses as may be opted for by a user. As a non-limiting example, real-time measurements and calculations may provide users with information necessary to make desired adjustments during the drilling process. In one embodiment, adjustments are enabled on a continuous basis (at the rate of drilling), while in another embodiment, adjustments may require periodic cessation of drilling for assessment of data. Accordingly, it should be recognized that "real-time" is to be taken in context, and does not necessarily indicate the instantaneous determination of data, or make any other suggestions about the temporal frequency of data collection and determination.

As further context for the teachings herein, consider aspects of formation composition and associated properties.

Classic evaluation of properties of formations 3 assumes that the formation 3 is homogenous and isotropic. With the advent of tools for measuring conductivities in orthogonal directions, more accurate evaluations may be made. For example, the tensorial nature of electrical properties can be obtained and used for improved saturations. Today, tensorial resistivities measurements are available from both wireline and logging while drilling instruments.

Generally, in sedimentary reservoir rocks, two types of anisotropy (directional dependence) are found. A first is that of intrinsic anisotropy (i.e., anisotropy originating in the mineral crystal structure or preferred orientation of rock components) or in layering at the microscopic level; another type is macroscopic anisotropy (i.e., anisotropy where layering is visible to the human eye, and may be composed of different, but homogenous layers).

Most commonly, macroscopic anisotropy is associated with thin sand-shale layers (such as laminated shaly-sands). Such anisotropic sands are common in deep water fans and turbidites.

Fractures, depending whether they are open or closed and the on the conductivity of the fracture filling material can also give rise to anisotropy. Fractures generally are oriented at high angles relative to a bedding plane and give rise to azimuthal anisotropy in the bedding plane. In thinly bedded formations 3, fractures will give rise to biaxial anisotropy. With respect to the origin of fractures, consider two cases: a first case involving drilling induced fractures, with a fracture filling fluid originating from the drilling mud (oil- or water based); and, a second case where natural fractures result from tectonic stresses, with a fracture filling fluid similar to the formation fluids. Thus, a main difference for the two cases is the assumed composition and resistivity of the fracture filling fluid. See FIG. 6.

Figure 6A:
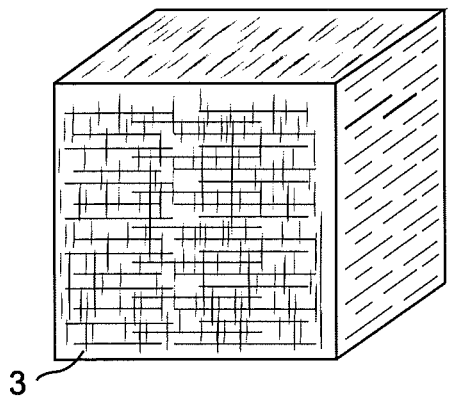
FIG. 6A and FIG. 6B, collectively referred to herein as FIG. 6, depict aspects of biaxial anisotropy.
Figure 6B:
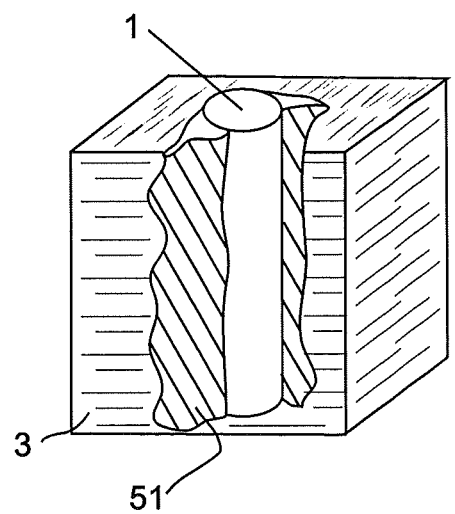

In FIG. 6, aspects of biaxial anisotropy are shown. In FIG. 6A, biaxial anisotropic rock (i.e., formation 3) is shown. This includes superposition of transverse isotropic medium and oriented natural fractures. In FIG. 6B, biaxial anisotropy is shown resulting from a drilling induced fracture 51 in a transverse isotropic medium (i.e., formation 3).

With simple parallel and series resistor networks, the effect of the fractures 51 and the fluid in the fractures and their relation to biaxial anisotropy can be understood. Starting with a laminated sands and shales (horizontal layers in the x-y-plane) with thin vertical fracture oriented in the x-z-plane, the effect of these fractures on the electrical resistivity, R, for the three principal directions $R_x$, $R_y$, $R_z$ may be characterized. Reference may be had to FIG. 7.

Figure 7A:
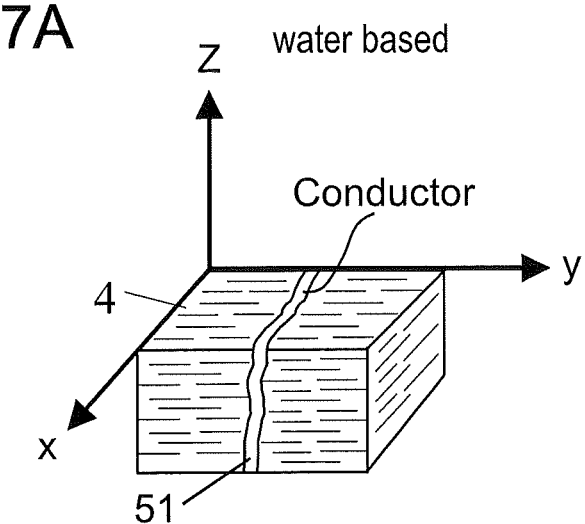
FIG. 7A and FIG. 7B, collectively referred to herein as FIG. 7, depict principles of analysis for considering an effect of fracture filling fluids on resistivity measurements.

For a conductive filling fluid in the fracture 51, such as water based mud, and as shown in FIG. 7A, a presence of fracturing will result in a decrease of the resistivities in all directions parallel to the fracture 51. Little or no influence on $R_y$ will be realized. Thus, the fracture effect is most pronounced on the X and Z directions. Fracturing results in an anisotropy in the horizontal plane with $R_x<R_y$.

Figure 7B:
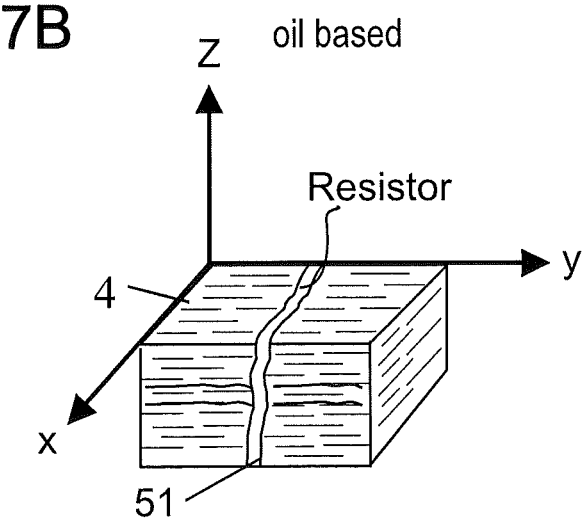

For a resistive filling fluid in the fracture 51, such as oil based mud, and as shown in FIG. 7B, a presence of fracturing will result in a dramatic increase of the resistivity in the direction perpendicular fracture plane ($R_y$) but practically no effect on the resistivity in directions parallel to the fracture. Thus, the impact of fractures is most pronounced on Y direction. In this case, fracturing results in an anisotropy in the horizontal plane with $R_y>R_x$.

Accordingly, it may be expected that the magnitude of the effects of biaxial anisotropy to be controlled mainly by the resistivity contrast between the unfractured formation and the fracture porosity and fluid in the open fracture.

Now, quantitatively consider the effect of fractures on a transverse isotropic medium. First, start with a transverse isotropic media with near vertical fractures making an angle, α with respect to the bedding normal. For quantitative considerations, it is assumed the fractures are normal to the bedding plane. The derivation follows from the laws for parallel and series resistor networks, as depicted in FIG. 8.

Now, also with reference to FIG. 9, to model the biaxial anisotropy attributable to fracturing, we express the resistivities in terms of the horizontal resistivities of unfractured media ($R_{form,h}$), a macroscopic manifestation of a transverse isotropic media consisting of unfractured laminated sand and shales, where $R_{form,h}$ represents parallel to the bedding plane; vertical resistivity of an unfractured media ($R_{form,v}$) the macroscopic manifestation of a transverse isotropic media, where $R_{form,v}$ represents the resistivity perpendicular to the bedding plane; fracture filling fluid (mud, mud filtrate, or formation fluids) resistivity ($R_m$, $R_{mf}$, respectively); and fracture porosity, $\phi_f$. The resistivity of the unfractured laminated shaly may then be estimated by Eqs. (1) and (2):

$$R_{form,h} = (1-V_{sh}) \cdot R_{sd} + V_{sh} \cdot R_{sh,h}; \quad (1)$$

$$R_{form,v} = \left[\frac{(1-V_{sh})}{R_{sh}} + \frac{V_{sh}}{R_{sh,v}}\right]^{-1}; \quad (2)$$

where:
- $V_{sh}$ represents laminar shale content;
- $R_{sd}$ represents resistivity of the porous sand fraction (without fracture), and
  - $R_{sd}$ may be estimated as: $R_{sd}=\phi^{-m} \cdot S_W^{-n} \cdot R_W$;
- $R_{sh,h}$ represents resistivity of the shale sand fraction (without fracture), parallel bedding;
- $R_{sh,h}$ represents resistivity of the shale sand fraction (without fracture), perpendicular bedding.

Consider now the effects of water-based and oil-based mud drilling induced fractures with this model.

In a first aspect of effects of evaluation of drilling induced fractures, forward modeling drilling induced fractures are considered. An exemplary model has two pore systems with different petrophysical properties. For these properties, and with regard to the intergranular pore system of the sand fraction, it is assumed, that the pore system with "sand" porosity, $\phi_{sd}$, can be characterized by Archie's equation with the parameters, m=n=2. With regard to the fracture system, a description of electrical properties of fractured rocks using Archie's equation leads to small exponents m ranging from about 1 to about 1.2. In this study, ideal fracture values were found to be about where m=n=1.

In order first calculations for the three principal components of the resistivity tensor, $R_x$, $R_y$, and $R_z$, a forward calculation with the following input parameters were applied. For the sand fraction: $\phi_{sd}$=0.25; m=n=2; $R_w$=0.035 Ohm-m; and $S_w$=1.0, 0.5, 0.1. For the shale fraction: $R_{sh,h}$=1 Ohm-m; and $R_{sh,v}$=3 Ohm-m.

Figure 10:
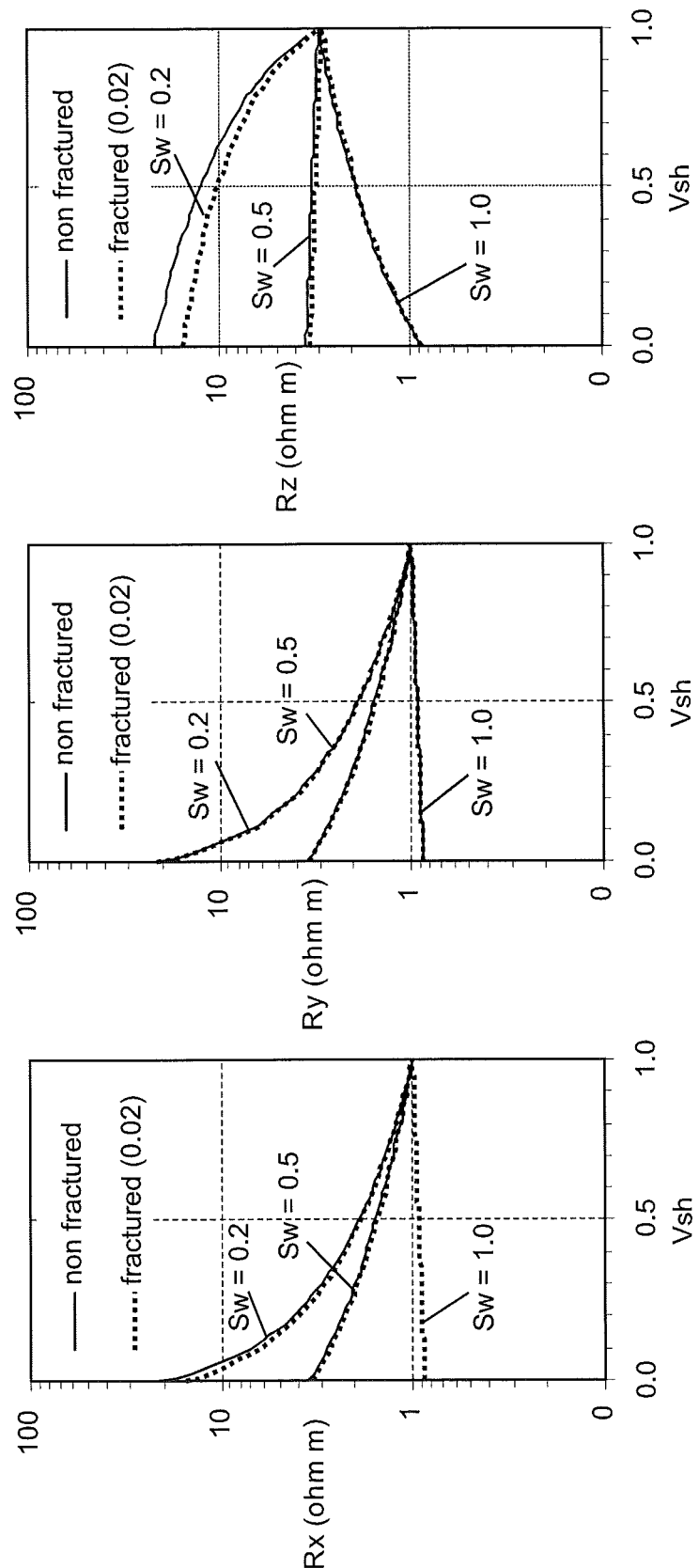
FIGS. 10-17 depict aspects of performance for measurements according to one of an X, Y and Z direction, and include some normalized data.

For the fracture filling fluid (whole mud or possibly mud filtrate), we use a relatively fresh mud resistivity of 1 Ohm-m for the water-based mud and 200 Ohm-m for the oil-based mud. In addition, the water saturation in the drilling induced fractures may be varied. For both water-based and oil-based muds, the impact of water saturation for three water saturations are evaluated, where $S_w$=1.0, 0.5, 0.2. Shown in FIG. 10 are the results for water-based mud. Resistivities $R_x$, $R_y$, $R_z$, are plotted as function of the laminar shale volume fraction for unfractured and fractured ($\phi_f$=0.02) formation.

Figure 11:
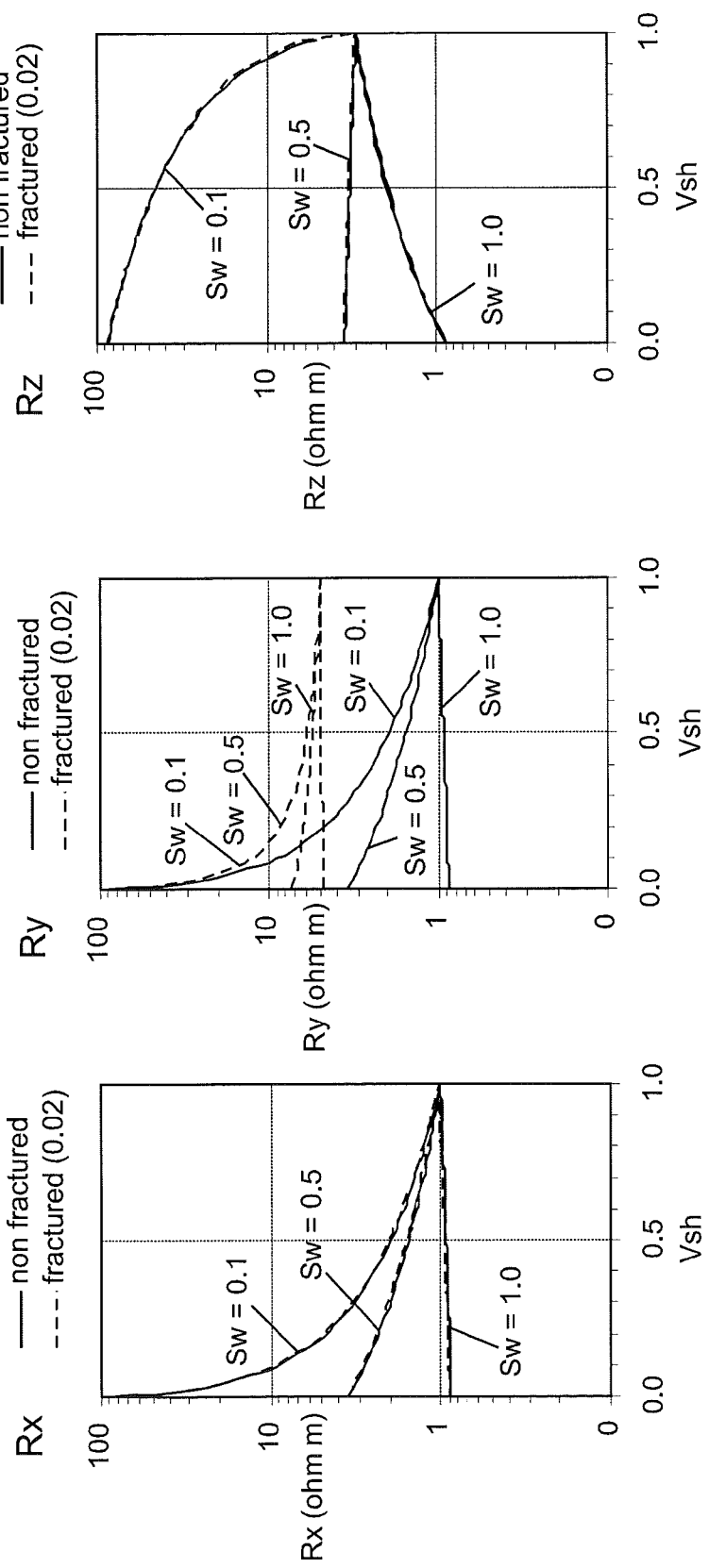

More specifically, FIG. 10 shows resistivities as function of the laminated shale content of the formation for water based mud. Curves are calculated for unfractured and fractured formation ($\phi_f$=0.02). Corresponding results for an oil-based mud are shown in FIG. 11. In FIG. 11, resistivity as function of the laminated shale content of the formation for oil-based mud drilling induced fractures is shown. Curves are calculated for unfractured and fractured formation ($\phi_f$=0.02).

It is seen that the results depend strongly on fracture filling fluid type and saturation. Accordingly, it is found that for the resistivities parallel to the fracture plane $R_x$ and $R_z$, that in the water-based mud case, resistivities are influenced only slightly by the drilling induced fracture. The small effect results from the "parallel conductor effect" which is characterized by the influence of the conductive component (i.e., conductive fluid in the fracture). Note that the small effect on $R_x$ and $R_z$ is easily masked by the presence of the highly conductive shale laminations. In the oil-based mud case, there is no noticeable effect on $R_x$ and $R_z$ because the resistive fracture is masked by the "parallel conductor" effect of the more conductive formation.

Accordingly, for the resistivity perpendicular to the fracture plane, $R_y$, in case of a water-based mud, there is no noticeable effect because the effect of the conductive fracture (low resistivity) is small relative to the resistive formation (i.e., the "series resistor" effect is dominated by the high formation resistivity. In case of an oil-based mud, even for small fracture porosity is strong influenced by the resistive fracture. The effect is most pronounced as the laminated shale content increases.

Figure 12:
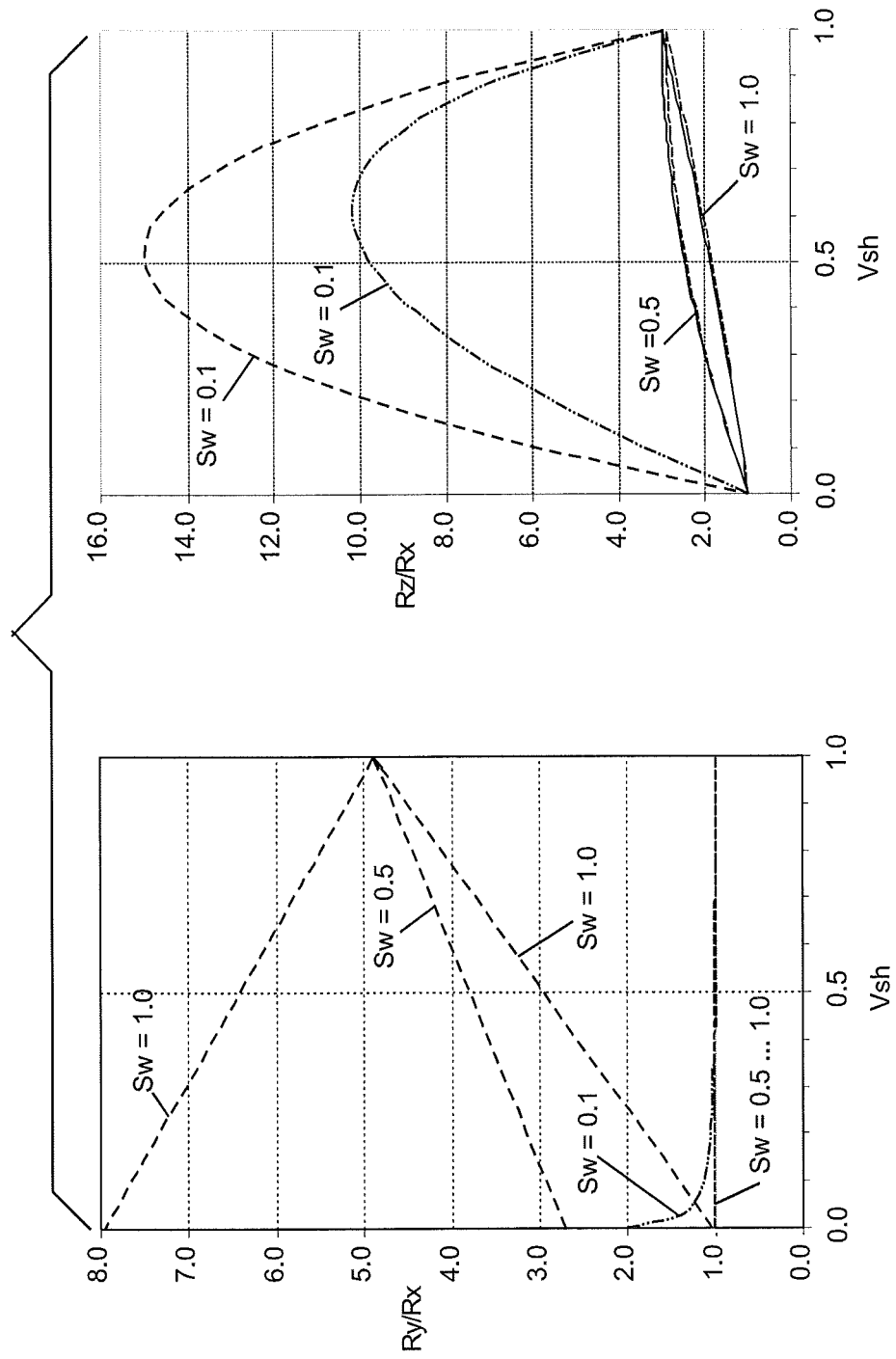

For a transversely anisotropic formation, a ratio of the vertical to horizontal resistivity ($R_v$:$R_z$) is generally presented, but when there are two sources of directional dependence for the anisotropy it is less clear which ratio should be used. Shown in FIG. 12 are the vertical ($R_z$) to horizontal resistivity perpendicular to the fracture plane ($R_y$). In general, for the laminated and fractured rock:the ratio $R_z$:$R_x$ reflects mainly anisotropy resulting from lamination, because fracturing has a similar contribution on both resistivities, whereas the ratio $R_y$:$R_x$ reflects mainly anisotropy resulting from fracturing, because fracturing has different contribution on both resistivities, but lamination has a similar influence.

FIG. 12 depicts resistivity ratios $R_z$:$R_y$ and $R_y$:$R_x$ as a function of the shale content for water-based mud and oil-based mud. Calculations for a fractured formation ($\phi_f$=0.02) and different formation water saturations.

In FIG. 12, the ratios $R_z$:$R_y$ and $R_y$:$R_x$ for a biaxial anisotropic medium clearly show that the vertical anisotropy, $R_z$:$R_y$, still dominates anisotropy in a sand-shale layered system, but the maximum no longer occurs at 50% $V_{shale}$ laminar, but moves to higher or lower values depending on whether the drilling induced fracture occurs when drilling with a water or oil-based mud, respectively. The anisotropy in the bedding plane 5, (e.g., horizontal anisotropy ratio ($R_y$:$R_x$)) shows that this ratio increase significantly for oil-based mud filled drilling induced fractures 51. However, for water-based mud there is very little to no effect except when the $V_{shale}$ laminar content is very small (<10%).

With respect to fracturing perpendicular to bedding the ratio $R_y$:$R_x$ carries the information on the fracture anisotropy. Combining Eqs. (1) and (2) results in Eq. (3):

$$\frac{R_y}{R_x} = (1-\phi_f) \cdot \left\{1+\phi_f \cdot \left(\frac{R_{mf}}{R_{form,h}} + \frac{R_{form,h}}{R_{mf}}\right)\right\} + \phi_f^2 \quad (3)$$

which confirms that the anisotropy effect is controlled by fracture porosity, $\phi_f$, and the resistivity contrast of formation and fracture filling material, $R_{mf}/R_{formation}$. The dependence of the azimuthal resistivity anisotropy on fracture porosity is shown in FIG. 13.

Figure 13:
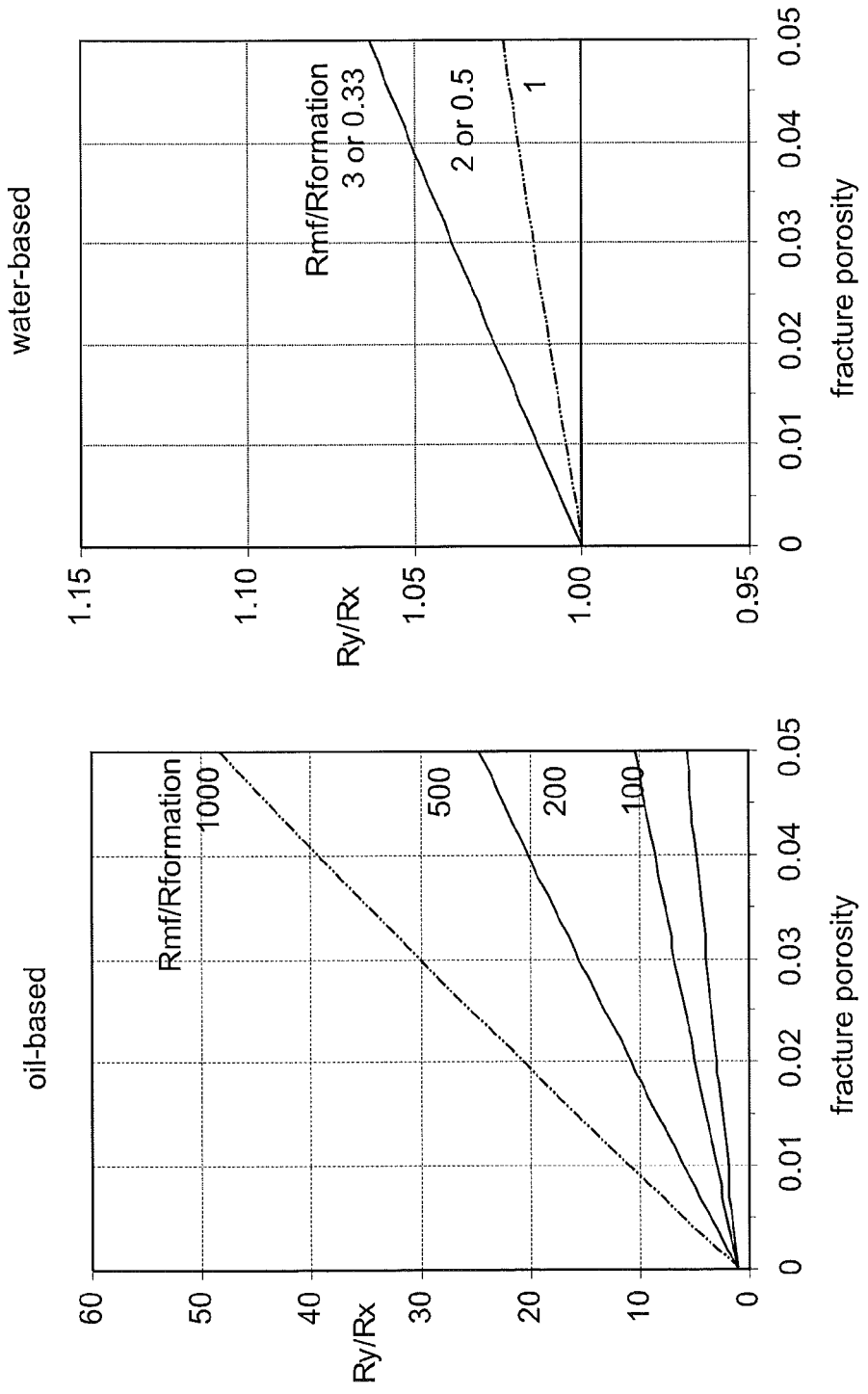

In FIG. 13, the ratio $R_y$:$R_x$ is shown as a function of fracture porosity, $\phi_f$, for water-based mud (left) and oil-based mud (right). Indicated in the figures is the parameter $R_{mf}$:$R_{formation}$. Note the different scales for the two cross plots.

Consider now a resistivity model for naturally fractured rock Sedimentary rocks that are subject to external stresses can fracture. Refer again to the simplified model, with vertical fractures orthogonal to the sedimentary laminations and parallel to the xz-plane. Applying the same model as for the drilling induced fractures, it is further assumed that the individual fractures are connected.

However, in contra-distinction to the drilling induced fracture, it may be assumed that natural fractures contain the same fluid components as the sand pore system. However, in these examples, different water saturations in the fractures 51 have not been accounted for. Therefore equations (1) to (3) must be modified by introducing a saturation term for the fracture filling fluids, $S_{w,f}$. For hydrocarbon bearing intervals, it may be assumed that the water saturation in the fractures 51 is lower than the water saturation in the fine pores of the laminated sands. Accordingly, resistivities in x, y and z directions may be estimated by Eqs. (4), (5) and (6), respectively.

$$R_x = ((1-\phi_f) \cdot R_{form,h}^{-1} + \phi_f S_{w,f} R_w^{-1})^{-1} \quad (4);$$

$$R_y = ((1-\phi_f) \cdot R_{form,h} + \phi_f S_{w,f}^{-1} \cdot R_w) \quad (5);$$

$$R_z = ((1-\phi_f) \cdot R_{form,v}^{-1} + \phi_f S_{w,f} R_w^{-1})^{-1} \quad (6).$$

Figure 14:
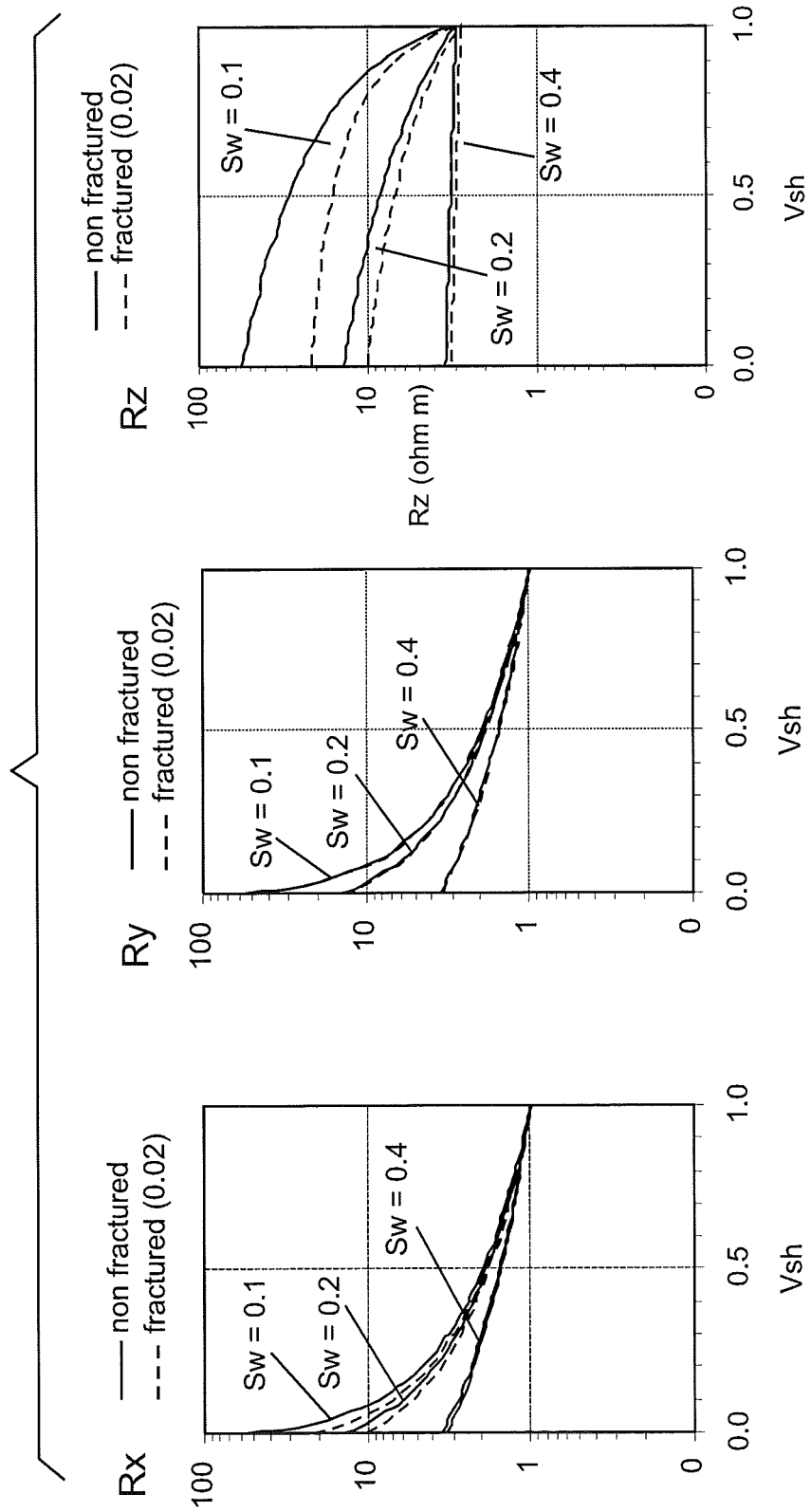

FIG. 14 shows the calculated resistivities for $R_x$, $R_y$ and $R_z$ again versus shale content $V_{sh}$. For computations herein, the input parameters are now provided. For the sand fraction, inputs include: $\phi$=0.25, m=n=2, $R_w$=0.035 Ohm-m; sand water saturation, $S_w$=0.4, 0.2, 0.1. For the shale fraction, inputs include: $R_{sh,h}$=1 Ohm-m, $R_{sh,h}$=3 Ohm-m. Regarding the fracture porosity, inputs include: $\phi_f$=0.02, the fracture water saturation, $S_{w,f}$=0.05. In FIG. 14, resistivity as function of the laminated shale content for naturally fractured formation is shown. Curves are calculated for unfractured and fractured formation ($\phi_f$=0.02, fracture water saturation $S_{w,f}$=0.05). The sand of the laminated formation has a porosity of $\phi_{sd}$=0.25 and water saturation is as indicated.

Figure 15:
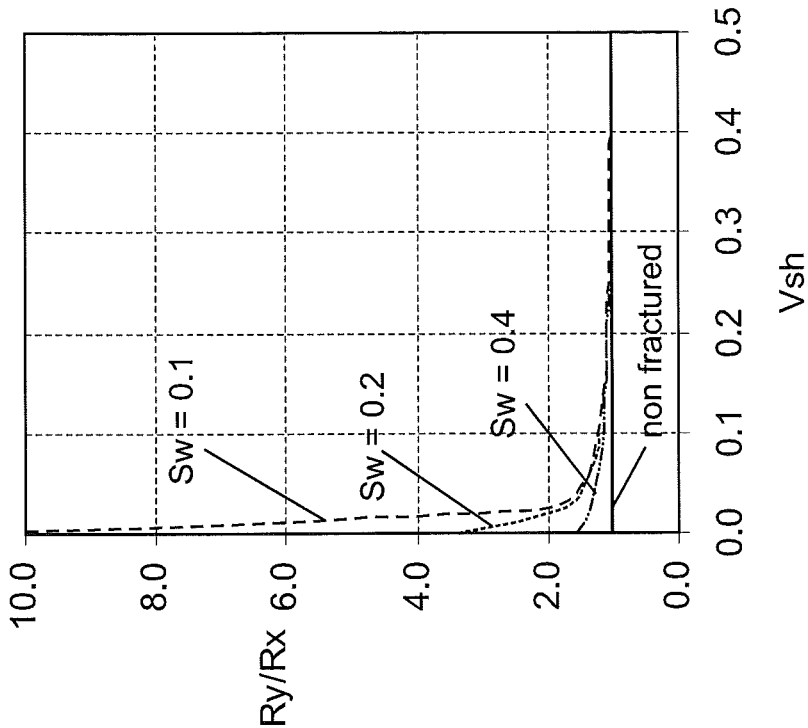

FIG. 15 illustrates the effect of fractures on the ratio of the two horizontal resistivities, $R_y$:$R_x$. The ratio, $R_y$:$R_x$, decreases rapidly as the shale content increases. The low horizontal resistivity of the shale masks the effect of the fractures. Similarly increasing sand water content decreases the importance of the conductivity of the water in the fractures and the resulting azimuthal anisotropy decreases.

In FIG. 15, the resistivity ratio $R_y$:$R_x$, is shown versus shale content. For non fractured formation and fractured formation ($\phi_f$=0.02, fracture water saturation, $S_{w,f}$=0.05). The sand of the laminated formation has a porosity of $\phi_{sd}$=0.25 and water saturation is as indicated.

Therefore, the azimuthal resistivity anisotropy, $R_y$:$R_x$, is considered indicative of fracturing in a hydrocarbon bearing, low laminated-shale content, high horizontal formation resistivity (i.e., resistivity high compared with the fracture resistivity) which is proportional $R_w/S_w$ (indicating low shale content, low water saturation, and low porosity). In the limit of no laminated shale, the biaxial anisotropy reduces to a simple uni-axial azimuthal anisotropy.

Combing equations (4) and (5) for naturally fractured rocks, Eq. (7) is obtained:

$$\frac{R_y}{R_x} = (1-\phi_f)\cdot\left\{1+\phi_f\cdot\left(\frac{R_w}{S_w\cdot R_{form,h}}+\frac{S_w\cdot R_{form,h}}{R_w}\right)\right\}+\phi_f^2. \quad (7)$$

Figure 16:
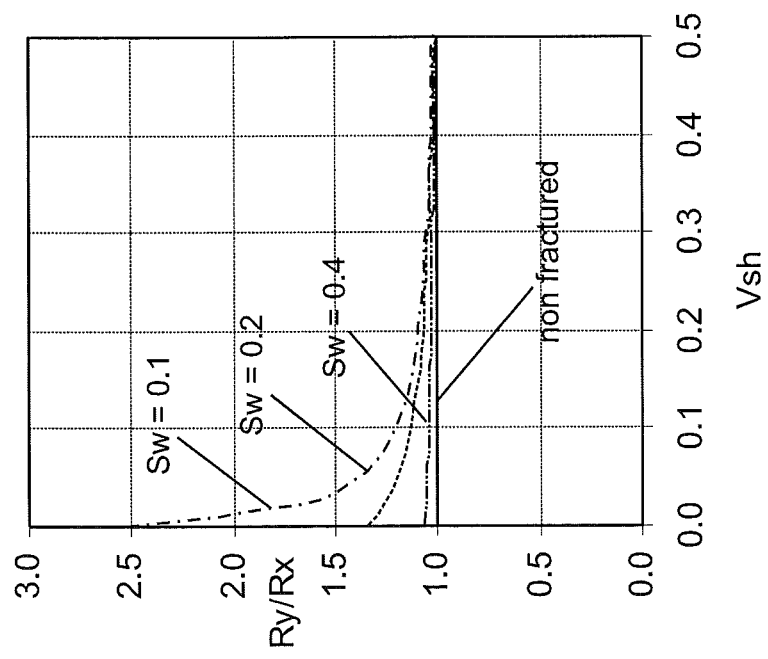
Figure 17:
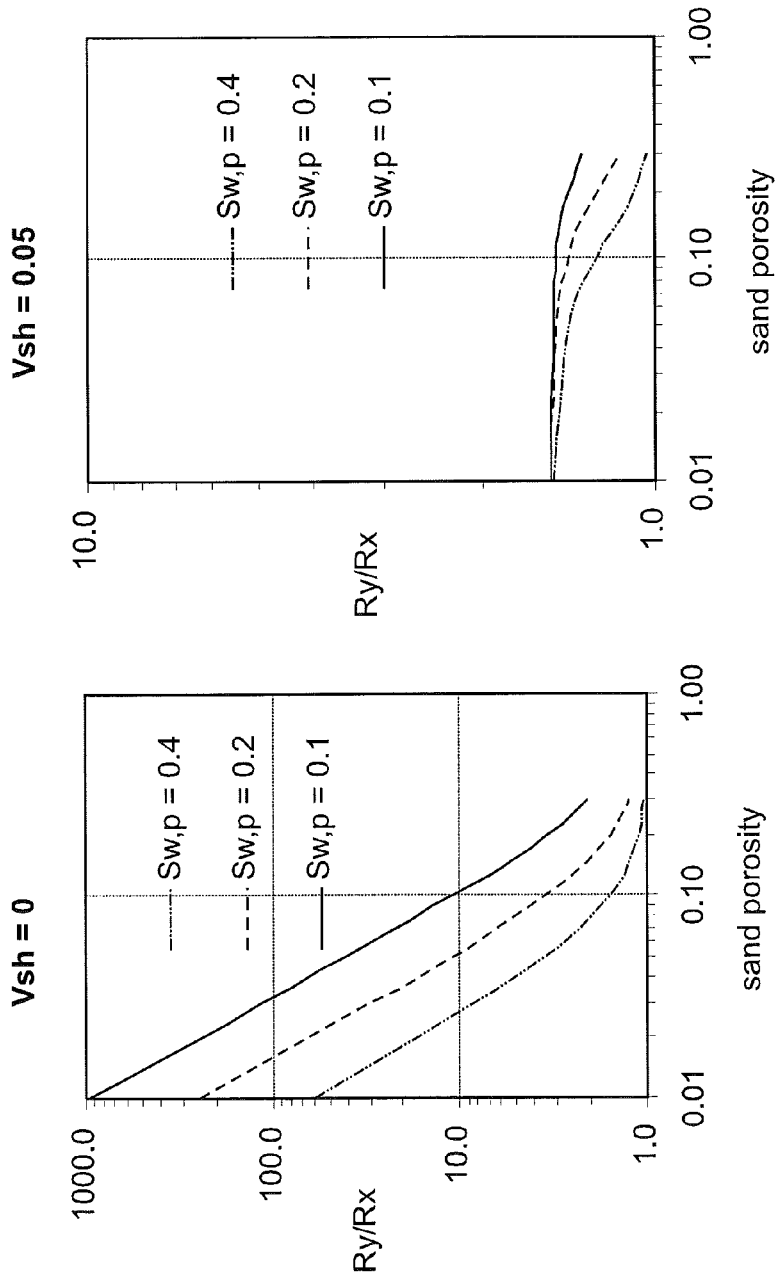
Figure 19B:
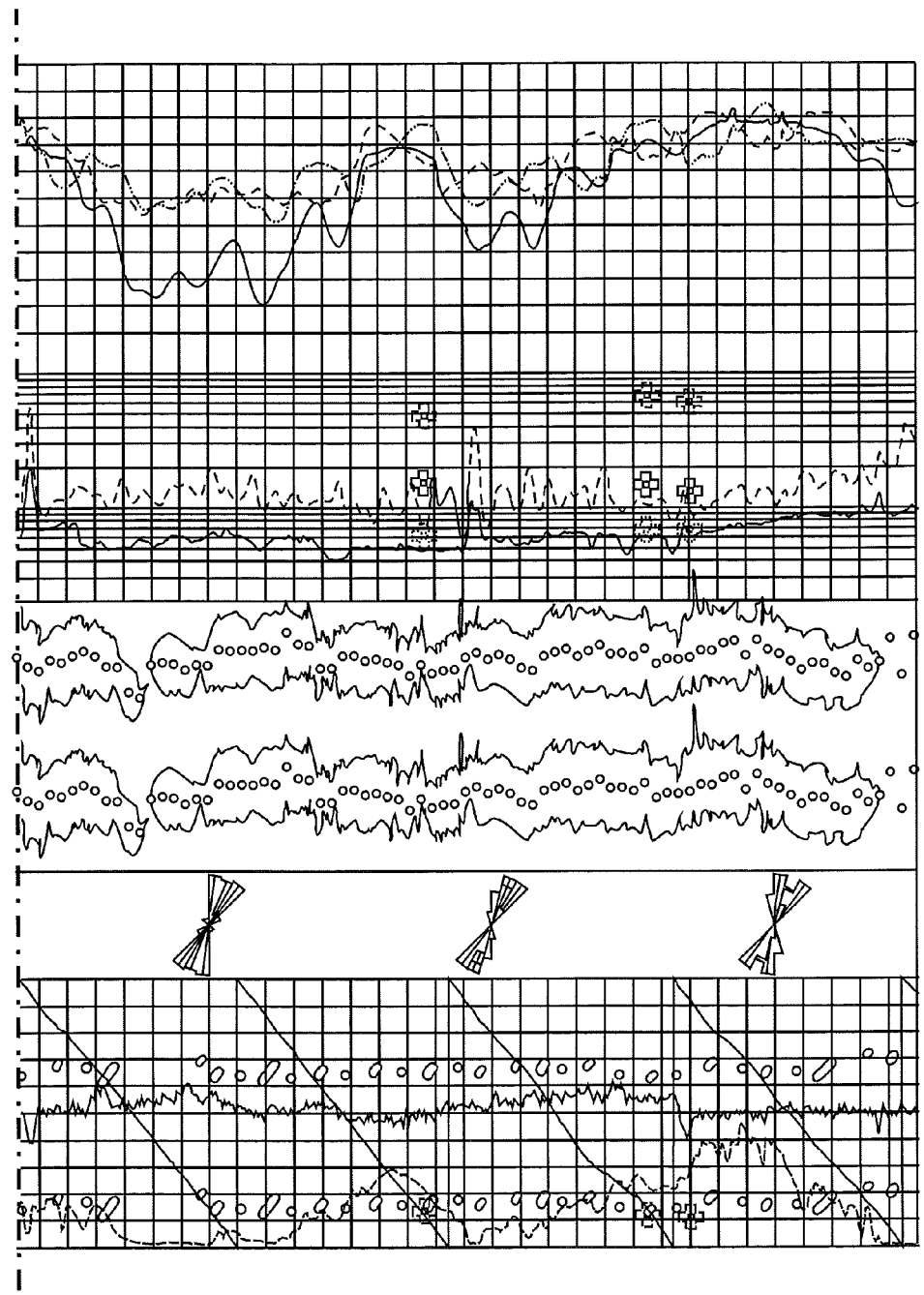

Shown in FIG. 16 are results for a laminated, tight sand (perhaps an interbedded shale-silt formation) with a porosity of $\phi_{sd}$=0.1. The azimuthal resistivity anisotropy, particularly for low shale content increases very strong. For the case of a clean fractured sand ($V_{sh}$=0), FIG. 17 shows the increase of the effect with decreasing formation conductivity originated by further decreasing porosity.

FIG. 16 shows the resistivity ratio, $R_y$:$R_x$, versus laminated shale content for unfractured and fractured formation ($\phi_f$=0.02, fracture water saturation $S_{w,f}$=0.05). The assumed porosity of the hydrocarbon bearing sands is 10% and the water saturations are as indicated. FIG. 17, shows the resistivity ratio, $R_y$:$R_x$, versus sand porosity for a fractured formation ($\phi_f$=0.02, fracture water saturation $S_{w,f}$=0.05). The laminated formation has a shale content $V_{sh}$=0 and $V_{sh}$=0.05 (right). The water saturation of the sand is indicated.

Turn now to the multi-component induction data and the processing and interpretation to find the best fitting biaxial resistivity model. A schematic configuration of the multi-component induction tool 10 is shown in FIG. 18. In this embodiment, the tool 10, 20 includes three orthogonally-oriented transmitter coils ($T_x$, $T_y$, $T_z$) and three also orthogonally-oriented receiver coils ($R_x$, $R_y$, $R_z$). At every logging depth this tool measures all nine components of a magnetic field generated by the tool 10, typically using multiple frequencies in the low frequency range.

In a transverse isotropic (TI) formation or in a formation with plane boundaries, particularly in a thinly laminated formation, the electromagnetic field of an arbitrary source may be described as a combination of two modes: transverse electric, TE, and transverse magnetic, TM. The TE mode has a planar electric field parallel to the boundary planes. In the TM mode, the magnetic field is planar.

Traditional induction transmitters (oriented normally to the boundaries) excite only the TE mode. The resulting electromagnetic field is sensitive only to horizontal resistivity, $R_h$. Transverse transmitters (parallel to the boundaries) excite two modes, TE and TM. Since the electric field contains both components, parallel and perpendicular to the boundaries, the transversal measurements $H_{xx}$ and $H_{yy}$ depend on both vertical and horizontal resistivity, $R_v$ and $R_h$. If there is no relative dip between the tool 10 and formations 3, all cross-components are equal to zero as there is no coupling between a transmitter and an orthogonal receiver. If the relative dip is not zero, all transmitters excite both TE and TM modes and all nine components depend on $R_h$ and $R_v$.

In a bi-axially anisotropic formation 3, even with one of the principal axis of resistivity tensor oriented perpendicular to plane boundaries, the introduction of two modes is practically meaningless because a solution does not exist for TE nor TM. This means that all components of the measured magnetic tensor depend on all three principal formation resistivities, $R_x$, $R_y$ and $R_z$.

The current pattern and the behavior of corresponding magnetic fields excited by transversal coils are very complex, even in a uniform TI formation. Shoulder beds, bed boundary interfaces, the borehole (filled with either resistive or conductive drilling mud), as well as invasion cause additional significant distortions. Accordingly, some of these effects are now briefly discussed and illustrate challenges associated with understanding physics of the multi-component tool 10 and developing reliable processing software.

Current patterns. In an anisotropic formation 3, currents are not parallel to the electric field. This leads to a concentration of electric charges in the formation volume. As a result, the currents, which are planar and circular in the isotropic formation, follow a 3D flow pattern in the case of anisotropic medium.

Skin-effect. The transversal $H_{xx}$ and $H_{yy}$ components exhibit much stronger skin-effect than the conventional $H_{zz}$ component. To compensate for that, one needs to measure responses at lower frequencies (consequently, move to lower signal levels) or acquire data at multiple frequencies and use sophisticated multi-frequency skin-effect correction techniques.

Bed boundary effects. Even in isotropic formations, electrical charges appear at interfaces of beds if the electric field has a component perpendicular to bed boundaries. The electrical charges affect the direction of original currents causing sharp turns in the current lines. If a resistivity contrast is high enough, the resulting magnetic field may even change sign near bed interfaces causing the appearance of infamous "horns" on the logs. As a result, transversal induction logs do not follow the resistivity distribution and are harder to understand and interpret.

Borehole and invasion effects. Transversal induction measurements are affected by borehole and invasion much more than conventional co-axial measurements. Even in an oil-based mud, where conventional deep induction measurements do not require corrections, the effect on $H_{xx}$ and $H_{yy}$ components with similar spacing may increase up to 50% depending on the measurement frequency. The eccentricity effect on the transversal components is very strong as well, especially in conductive mud and high formation resistivity. It is very difficult to correct for such an effect because relative dip, in an anisotropic formation, may affect the measurements in a similar way making it very difficult to separate the two effects.

Azimuthal sensitivity. Traditional deep resistivity measurements with axially symmetric design (both galvanic and induction) do not have azimuthal sensitivity. On the contrary, the transversal coils provide strong azimuthal sensitivity. As a result, multi-component induction measurements can be used for a number of applications.

Accordingly, a solution to these challenges provided herein includes a new processing technology. That of multi-frequency focusing (MFF). MFF provides for reducing environmental effects and simplifying data dependence on the formation parameters. MFF processing is based on an expansion of the measured field into a frequency series. In MFF processing, one of the series terms does not depend on the borehole and invasion properties. MFF is a method of deriving this term from the multi-frequency measurements. After MFF, a simple 1-D vertical layered model can be used for the data interpretation because near-zone effects are effectively removed by MFF. MFF responses are very deep and have simplified dependence on the formation parameters including very small bed boundary effects. As discussed herein, the MFF processing algorithm is presented in terms of bi-axially anisotropic formations in more detail.

As discussed herein, "multi-component" generally refers to magnetic field components sufficient to obtain axial component (conventionally $H_{zz}$ component, and the cross components $H_{xx}$ and $H_{yy}$) MFF provides a technique for correcting the complicated data. In MFF processing, it is critical to have at least one of cross component data, fully orthogonal coils or tilted coils.

Consider MFF processing with regard to processing multi-component induction data for biaxial anisotropy. In the following discussion a bi-axially anisotropic formation is considered where, in a principal coordinate system (x, y, z), a conductivity tensor is described by Eq. (8)

$$\hat{\sigma} = \begin{pmatrix} \sigma_x & & \\ & \sigma_y & \\ & & \sigma_z \end{pmatrix}; \quad (8)$$

It may also be assumed that a multi-component induction logging tool acquires at every depth a magnetic matrix, which is recorded in the tool coordinate system 22 (x',y',z'), as provided in Eq. (9):

$$\hat{H}' = \begin{pmatrix} h_{x'x'} & h_{x'y'} & h_{x'z'} \\ h_{y'x'} & h_{y'y'} & h_{y'z'} \\ h_{z'x'} & h_{z'y'} & h_{z'z'} \end{pmatrix} \quad (9)$$

where the first index indicates an orientation of a transmitter and the second index specifies the orientation of a receiver. For clarity, a thick anisotropic layer is considered. In this case an arbitrary position of the tool 10 can be fully described with the three Euler angles: tool azimuth, $\phi$, relative dip, $\theta$, and tool rotation, $\psi$.

It can be shown that matrix (9) cannot be diagonalized if the relative dip is not zero. In special cases, when the tool azimuth angle $\phi$ is 0, 90, 180, or 270 degrees in the principal coordinate system the matrix (9) has five non-zero components. In all other situations when the relative dip is not zero even in the earth coordinate system 20, the matrix (9) is full.

The situation becomes different when a multi-frequency focusing is applied to the magnetic matrix to extract terms proportional to $\omega 3/2$. In a deviated well (i.e., non-zero relative dip) the matrix of MFF components looks similar to the magnetic matrix, as provided in Eq. (10):

$$\hat{H}'_{MFF} = \begin{pmatrix} \tilde{h}_{x'x'} & \tilde{h}_{x'y'} & \tilde{h}_{x'z'} \\ \tilde{h}_{y'x'} & \tilde{h}_{y'y'} & \tilde{h}_{y'z'} \\ \tilde{h}_{z'x'} & \tilde{h}_{z'y'} & \tilde{h}_{z'z'} \end{pmatrix} \quad (10)$$

It can be shown that in deviated wells in the earth coordinate system 20, the components of the multi-frequency focused magnetic field become diagonilized (contrary to the original magnetic matrix), as provided by Eq. (11):

$$\hat{H}_{MFF} = \begin{pmatrix} \tilde{h}_{xx} & & \\ & \tilde{h}_{yy} & \\ & & \tilde{h}_{zz} \end{pmatrix} \quad (11)$$

Accordingly, the MFF matrix may be expressed in the tool coordinate system 22 (see Eq. (10)) through the MFF matrix in the earth coordinate system 20 (see Eq. (11)) using a tensor rotation rule, as provided by Eq. (12):

$$\hat{H}'_{MFF} = \hat{R}\hat{H}_{MFF}\hat{R}^T \quad (12)$$

The rotation matrix, $\hat{R}$, can be obtained from the Euler's rotation theorem, provided in Eq. (16):

$$\hat{R} = \hat{R}_z(\psi) \cdot \hat{R}_y(\theta) \cdot \hat{R}_z(\phi) \quad (13)$$

where $\hat{R}_z(\psi)$, $\hat{R}_y(\theta)$, $\hat{R}_z(\phi)$ are standard Euler rotation matrices expressed through sin and cos of corresponding angles.

Considering Eqs. (10), (11) and (13), it may be observed that in the right-hand side of the Eq. (12), there are six (6) unknowns. The unknowns include three principal components $\tilde{h}_{xx}$, $\tilde{h}_{yy}$, $\tilde{h}_{zz}$ and three angles $\phi$, $\theta$, $\psi$. Also, it may be observed that the left-hand side of the Eq. (12) includes nine (9) measurements. As Eq. (12) is correct at every logging depth, an algorithm has been derived and yields maximum stability and robustness in recovering the unknowns.

The algorithm for obtaining the three (3) resistivities ($R_x$, $R_y$, $R_z$) generally includes two sequential steps: 1). Processing for three (3) unknown angles and three (3) multi-frequency focused principal components; 2). Inverting the three (3) principal multi-frequency focused magnetic field components for three (3) principal resistivities.

At the first step at every logging depth, the azimuth angle, $\phi$ is incrementally changed from 0 to 180 degrees, the relative dip, $\theta$, is changed from 0 to 90 degrees, and the rotation angle, $\psi$, is changed from 0 to 360 degrees. For every set of $\phi$, $\theta$, and $\psi$, the system of equations leading to Eq. (12) may be solved for the unknown principal components $\tilde{h}_{xx}$, $\tilde{h}_{yy}$, $\tilde{h}_{zz}$ using the least-squares technique. The values of $\phi$, $\theta$, $\psi$, $\tilde{h}_{xx}$, $\tilde{h}_{yy}$, $\tilde{h}_{zz}$ obtained may then be placed back into Eq. (12) and calculate the synthetic values of multi-frequency focused responses, $\tilde{h}$. Using some norm, a misfit value of the measured and synthetic MFF components may be calculated for every combination of angles. The angle with the minimum misfit value is then selected. The principal components from the optimal set of angles are used in the following interpretation for $\sigma_x$, $\sigma_y$, and $\sigma_z$.

After the three angles and three principle components are determined, the second processing step is to recover the true formation resistivities, ($R_x$, $R_y$, $R_z$). It should be noticed that in the case of the bi-axial anisotropy, each principal component depends on all three (3) formation resistivities ($R_x$, $R_y$, $R_z$), which makes the sequential processing for the three (3) resistivities impossible. In the thick layer, an inversion algorithm was developed that uses a look-up table that contains pre-calculated values of the principal components for all possible combinations of the principal conductivities. To reduce the size of the look-up table, three formation conductivities are considered to be in decreasing order ($\sigma_x$ is the largest). Also, the principal components are converted to apparent conductivities and normalized by the largest value ($\sigma_{app}$ ($\tilde{h}_{zz}$)). These measures and the smoothness of the function allow construction of a very compact two-dimensional look-up table calculated for $\sigma_x = 1$. This yields ten (10) different values of $\sigma_x/\sigma_y$ (from 1 to 22.63), and ten (10) similar values of $\sigma_x/\sigma_z$ (actually, due to the decreasing order of conductivities, only the upper triangle of this table is calculated and used). The calculations for the look-up table and for the following numerical tests were conducted using the newly developed forward modeling code for bi-axially anisotropic formations.

To validate the theory and algorithms described above, measurements of the tool 10 have been simulated for a thick bi-axially anisotropic layer for various sets of parameters (three (3) angles and three (3) conductivities). The results for two models are presented below.

In the first model, the following parameters were applied. Model 1. $\sigma_x=1$ S/m ($\rho_x=1$ Ohm-m), $\sigma_y=0.5$ S/m ($\rho_y=2$ Ohm-m), $\sigma_z=0.125$ S/m ($\rho_z=8$ Ohm-m), $\phi=15°$, $\theta=45°$, $\psi=30°$.

To demonstrate the single frequency response, a skin-effect correction was applied using ten (10) frequencies of the tool 10. The measurements were converted to apparent conductivities (S/m). The results in the tool coordinate system 22 and in formation coordinate systems 21 are presented below, as Eqs. (14a) and (14b), respectively:

$$\hat{H}' = \begin{pmatrix} 0.413 & -0.081 & -0.340 \\ -0.081 & 0.371 & 0.261 \\ -0.340 & 0.261 & 0.535 \end{pmatrix} \quad (14a)$$

$$\hat{H} = \begin{pmatrix} 0.509 & 0.017 & 0.141 \\ 0.017 & 0.338 & 0.018 \\ 0.141 & 0.018 & 0.442 \end{pmatrix} \quad (14b)$$

The tool responses after multi-frequency focusing and normalizing to the apparent conductivity in the tool coordinate system 22 and in formation coordinate systems 21 are presented below, as Eqs. (15a) and (15b), respectively:

$$\hat{H}'_{MFF} = \begin{pmatrix} 0.545 & -0.087 & -0.319 \\ -0.087 & 0.459 & 0.264 \\ -0.319 & 0.264 & 0.534 \end{pmatrix} \quad (15a)$$

$$\hat{H}_{MFF} = \begin{pmatrix} 0.304 & -.001 & 0.014 \\ -0.001 & 0.470 & 0.006 \\ 0.014 & 0.006 & 0.716 \end{pmatrix} \quad (15b)$$

It may be seen that the numerical results (Eqs. (15)) agree with the theoretical Eq. (11) within the numerical accuracy of the calculation of the MFF components (all cross-components in the Earth coordinate system 28 are close to zero). Moreover, it may be noted that the increasing order of the principal diagonal components in matrix (15b) correctly reflects the decreasing order of the true formation conductivities in this model, which is not the case for the single frequency components.

The multi-frequency focused responses (18a) were used as an input in the least-square optimization algorithm described above. The output from this code provided the following values: fi=15.0; theta=45.0; psi=30.0; hh(1)=304.3; hh(2)=469.8; and hh(3)=716.4.

It may be seen that all the angles and the principal components were recovered with high accuracy (consider hh(i), and comparison with the calculated principal components (15b)). The obtained principal components were then used to estimate true formation resistivities, ($R_x$, $R_y$, $R_z$), as described above. The results obtained for this model were: $R_{xx}=0.999$; $R_{yy}=1.999$; and $R_{zz}=7.999$. Now consider the second test model.

In the second model, the following parameters were applied. Model 2. $\rho_x=3.3$ Ohm-m, $\rho_y=6.4$ Ohm-m, $\rho_z=9.7$ Ohm-m, $\phi=33°$, $\theta=66°$, $\psi=71°$.

The single frequency responses in the tool coordinate system 22 and in formation coordinate systems 21 corrected for the skin-effect and converted the results to apparent conductivities (S/m) are presented in Eqs (16a) and (16b):

$$\hat{H}' = \begin{pmatrix} 0.215 & 0.007 & 0.029 \\ 0.007 & 0.229 & 0.075 \\ 0.029 & 0.075 & 0.160 \end{pmatrix} \quad (16a)$$

$$\hat{H} = \begin{pmatrix} 0.338 & 0.032 & 0.016 \\ 0.032 & 0.341 & 0.014 \\ 0.016 & 0.014 & 0.081 \end{pmatrix} \quad (16b)$$

The tool responses after multi-frequency focusing and normalizing to apparent conductivity in the tool coordinate system 22 are provided by Eqs. (17a) and (17b):

$$\hat{H}'_{MFF} = \begin{pmatrix} 0.189 & -0.056 & 0.044 \\ -0.055 & 0.206 & 0.078 \\ 0.044 & 0.078 & 0.163 \end{pmatrix} \quad (17a)$$

$$\hat{H}_{MFF} = \begin{pmatrix} 0.134 & -0.002 & 0.004 \\ -0.002 & 0.196 & 0.001 \\ 0.004 & 0.001 & 0.222 \end{pmatrix} \quad (17b)$$

It can be seen that the numerical results of Eqs. (17) agree with the theoretical Eq. (11) within the numerical accuracy of the calculation of the MFF components (all cross-components in matrix 17b are close to zero). Again, it may be noticed that the increasing order of the principal diagonal components in (17b) correctly reflects the decreasing order of the true formation conductivities in this model, which is not the case for the single frequency components.

The multi-frequency focused responses (17a) were used as an input in the least-square optimization algorithm described above. The output from this code provided the following values: fi=33.0; theta=66.0; psi=71.0; hh(1)=133.4; hh(2)=195.4; and hh(3)=222.1.

It may be seen that all the angles and the principal components were recovered with high accuracy (consider hh(i), and comparison with the calculated principal components (17b)). The obtained principal components were then used to estimate true formation resistivities, ($R_x$, $R_y$, $R_z$), as described above. The results obtained for this model were: $R_{xx}=3.29$; $R_{yy}=6.36$; and $R_{zz}=9.31$.

In both Model 1 and Model 2, the recovered resistivities ($R_x$, $R_y$, $R_z$) for the formation 4 agree very well with the original resistivities ($R_x$, $R_y$, $R_z$) for the formation 4.

A field trial was completed where the processing described herein was applied for evaluations of bi-axially anisotropic formations using data from a well having drilling induced fractures. The well included a 12.25" vertical well and was drilled overbalanced with a 13.2 ppg synthetic oil-base mud. A wide spectrum of logging while drilling (LWD) and wireline logging data (data acquired after drilling) was acquired, including LWD propagation resistivity, wireline array induction data, multi-component induction data, and cross-dipole acoustic measurements data.

In a review of the data, the presence of drilling induced fractures in some intervals was immediately apparent based on the large difference between LWD resistivity and array induction resistivity data and separation of the shallow and deep array induction resistivity curves. The induction measurements were strongly affected by fractures as well. $H_{xx}$ and $H_{yy}$ components showed strong azimuthal sensitivity oscillating around each other in perfect correlation with the rotation angle. A typical manifestation of vertical fractures was high formation dips recovered from the induction data. The dip angles were up to about 90 degrees. In this case, the induction data proved to respond more to vertical fractures rather than to orientation of horizontal and vertical resistivities, meaning that TI model was not appropriate for interpretation any longer.

To test the teachings provided herein, four (4) depths were selected where the fractures were most pronounced. The results of the bi-axial anisotropy processing at these depths are presented in Table 1. For comparison, results from enhanced TI processing for fractured formations are included. The obtained resistivities in the Earth coordinate system 28 are presented in columns 2-4. It can be observed that in all cases $\rho_x$ and $\rho_z$ are slightly higher then $\rho_h$ and $\rho_v$ (columns 7, 8) correspondingly. The resistivity anisotropy in horizontal plane ($\rho_y/\rho_x$) is consistently between 8 and 10. The orientation of fractures (or the orientation of principal y-axis) obtained with algorithm provided herein (column 5) in all cases agrees within two (2) degrees with the rotation technique used in the enhanced TI processing (column nine (9)). The relative misfit of the measured and synthetic data presented in column six (6) indicates the good quality of inversion and consistency of the fractured formation with the bi-axial anisotropic model.

principal resistivities to be studied as a function of laminated shale content and as a function of fracture porosity for both drilling induced and natural fractures. The combined three-step analysis of measured principal resistivities based on the modular concept allows a separation and quantification of the two anisotropy sources: fracturing and lamination. The analysis based on the three principal resistivities provides an estimate of fracture porosity, resistivity of the porous sand fraction (without fractures) and water saturations.

In addition, an inversion algorithm for the biaxially anisotropic formations has been presented and may be used to reliably determine three principal resistivities from multi-component induction measurements. First, in the least-square inversion the multi-frequency focused magnetic field tensor is rotated to the principal coordinate system. This rotation is characterized by three angles: $\phi$, $\theta$, and $\psi$; and three principal, diagonal magnetic field components $H_{xx}$, $H_{yy}$, and $H_{zz}$. After the three angles and three principle components are determined, principal formation resistivities are estimated using a fast inversion algorithm based on a look-up table approach. To validate the theory and algorithms described above, the multi-component induction measurements in thick biaxially anisotropic layers have been simulated for various sets of

TABLE 1

Comparison of bi-axial anisotropy processing with enhanced TI processing

| | TI processing with fractures | | | | Biaxial anisotropy processing | | | | | Formation properties | | |
|---|---|---|---|---|---|---|---|---|---|---|---|---|
| Depth (m) | $R_h$ (Ohm m) | $R_v$ (Ohm m) | $\phi$ (Deg) | Fracture Length (ft) | $R_x$ (Ohm m) | $R_y$ (Ohm m) | $R_z$ (Ohm m) | $\phi$ (Deg) | Misfit (%) | $R_{form,h}$ (Ohm m) | $R_{form,v}$ (Ohm m) | $\Phi_f$ |
| D135.6 | 0.65 | 1.1 | 319 | 17 | 0.75 | 6.5 | 1.4 | 319 | 4.1 | 0.73 | 1.36 | 0.029 |
| D213.0 | 0.44 | 0.88 | 312 | 12 | 0.6 | 4.75 | 1.5 | 313 | 2.7 | 0.59 | 1.47 | 0.021 |
| D252.3 | 0.55 | 1.1 | 316 | 13 | 0.67 | 6.75 | 1.45 | 318 | 4.8 | 0.65 | 1.27 | 0.027 |
| D260.0 | 0.58 | 1.1 | 321 | 17 | 0.68 | 5.95 | 1.3 | 322 | 5.1 | 0.66 | 1.38 | 0.027 |

The model derived equations allow an inversion of processed data. Table 1 shows a realistic data set from a shale section. Results are based on the biaxial anisotropy model with fracture porosity, $\phi_f$, and formation resistivities, $R_x$, $R_y$, $R_z$) and mud filtrate resistivity, $R_{mf}$=200 ohm-m:

TABLE 2

Input data set (left) and result of inversion (right) for natural fractures

| | Input | | | Result | | |
|---|---|---|---|---|---|---|
| Depth (m) | Rx (ohm m) | Ry (ohm m) | Rz (ohm m) | $R_{form,h}$ (ohm m) | $R_{form,v}$ (ohm m) | $\phi_f$ |
| D135.6 | 0.75 | 6.50 | 1.40 | 0.73 | 1.36 | 0.029 |
| D213.0 | 0.60 | 4.75 | 1.50 | 0.59 | 1.47 | 0.021 |
| D252.3 | 0.67 | 6.75 | 1.45 | 0.65 | 1.27 | 0.027 |
| D260.0 | 0.68 | 5.95 | 1.30 | 0.66 | 1.38 | 0.027 |

In summary, presented herein are resistivity models for laminated sand-sale formations in the presence of drilling-induced and natural fractures. The principal resistivities $R_x$, $R_y$, $R_z$ are expressed as a function of horizontal and vertical resistivities of unfractured formation, fracture porosity and resistivity of fracture which is the resistivity of mud filtrate in the case of drilling induced fractures or the connate water resistivity and saturation in the case of natural fractures. These models allowed the effect of fractures on the three parameters and used the software to process the data. The new approach was also applied to the real measurements acquired in the well with drilling induced fractures and as a result principal formation resistivities, fracture orientation, and fracture porosity were reliably determined.

Accordingly, with a simple petrophysical model, the teachings herein have investigated the effects of fractures on the tensor resistivity properties of laminated rocks and demonstrated that fractures in such a systems give rise to biaxial anisotropy. In particular, this has focused on laminated sand-shale formations and investigated both natural and drilling induced fractures. For the case of natural fractures the effect of hydrocarbon saturation have been investigated. For drilling induced fractures both fractures flushed with water-based and oil-based muds have been considered.

The forward calculations provided demonstrate both subtle and dramatic changes in directional resistivities. The magnitude of the effects depends on whether the measurement is in or across the fracture plane and whether the fracture is filled with conductive or non-conductive fluid.

For convenience, it is considered herein that laminations lie parallel to the x-y plane and fractures are oriented in the x-z plane. Based on simple parallel and series resistor analogues and simple forward calculations, it is found that: the ratio $R_z:R_x$ reflects mainly anisotropy resulting from lamination, because the additional conductivity of the fractures has the same contribution to both resistivities, and that the ratio $R_y:R_x$ reflects mainly anisotropy resulting from fracturing, because fracturing effects the resistivities normal (y) and perpendicular (x) to the fracture plane differently while lamination effect is similar.

In detail the effects, particularly the fracture effects, are controlled by the contrast between the formation (unfractured) resistivity and the "fracture resistivity" (which is controlled by the fracture porosity and resistivity of fracture filling fluid). Therefore, results depend strongly on fracture filling fluid type and saturation. In particular, drilling induced fractures (oil-based mud) have practically no influence on the resistivities parallel to the fracture plane $R_x$ and $R_z$ ("parallel conductor effect"), but increase very markedly the resistivity perpendicular to the fracture plane, $R_y$, even for small fracture porosity. Therefore, there is a noticeable increase in the azimuthal resistivity ratio, $R_y R_x$, associated with the change in $R_y$. There is also a dependence on the formation conductivity, which in turn is controlled by shale content, porosity, water saturation. Further, drilling induced fractures (water-based mud) give rise to very small resistivities decreases parallel to the fracture plane $R_x$ and $R_z$, and have practical no influence on $R_y$. Hence, the fracture effect manifests itself as an increase of the ratio $R_y$:$R_x$ associated with the change of $R_x$. This effect is relatively small and decreases with increasing formation conductivity, which depends on shale content, porosity, and water saturation. In addition, natural fractures have an influence on the resistivities which is controlled again by the contrast of formation resistivity and fracture resistivity. The latter is a function of fracture porosity, water resistivity and fracture water saturation. Model calculations demonstrate that a clear fracture signature is to be expected in the azimuthal resistivity ratio $R_y$:$R_x$, especially for relatively resistive formations. As the laminar shale content increases the resistivities of both $R_x$ and $R_y$ decrease and mask the relatively small fracture effect. However, it may be expected that for a relatively clean, hydrocarbon bearing fractured tight-gas sandstone, that there might be a measureable biaxial resistivity effect.

Lastly, processing algorithms have been developed for multi-component induction data that allow us to extract best fit biaxial anisotropy data. In addition to the three principal resistivity components ($R_x$, $R_y$, and $R_z$), the three Euler angles that describe the orientation of the laminations and fractures ($\phi$, $\theta$, and $\psi$) may also be extracted. The model concept provided allows solving for the properties of the fractures (e.g., fracture porosity) as well as the properties of the sand and shale laminations.

Embodiments of the invention include various methods, systems, instruments and computer program products.

For convenience of referencing and to establish clarity, certain nomenclature as used herein is now presented. As used herein, the following variables generally are applied, and defined as follows:

x,y,z axis directions of the orthogonal Cartesian coordinate system x,y axis in the plane of bedding/lamination; horizontal axis z axis perpendicular to the plane of bedding/lamination, vertical axis)

Rx, Ry, Rz true specific electrical resistivities of the formation (including fractures) in the three axis directions $R_{form,h}$ resistivity of unfractured formation in horizontal directions (x,y)

$R_{form,v}$ resistivity of unfractured formation in vertical direction (z)

$R_{sh,h}$ resistivity of the shale sand fraction (unfractured) in horizontal directions (x,y)

$R_{sh,v}$ resistivity of the shale sand fraction (unfractured) in vertical direction (z)

$R_{sd}$ resistivity of the porous sand fraction (unfractured)

$R_w$ resistivity of the formation water $R_{mf}$ resistivity of the mud filtrate $\phi_{sd}$ porosity of the sand fraction (unfractured), $\phi_f$ fracture porosity $S_{W,sd}$ water saturation of the sand pores fraction, $S_{W,f}$ water saturation of the natural fractures, m,n Archie parameters $V_{sh,lam}$ laminar shale content $\hat{\sigma}$ conductivity tensor $\sigma_{x,y,z}$ conductivity tensor components in the principal coordinate system $\hat{H}'$ measured magnetic field tensor in tool coordinate system $h_{x'y'}$ components of the measured magnetic field tensor in tool coordinate system $\hat{H}'_{MFF}$ measured magnetic field tensor after MFF in tool coordinate system $\tilde{h}_{x'y'}$ components of the measured magnetic field tensor after MFF in tool coordinate system $\hat{H}_{MFF}$ measured magnetic field tensor after MFF in formation coordinate system $\tilde{h}_{xy}$ components of the measured magnetic field tensor after MFF in formation coordinate system $\phi$, $\theta$, $\psi$ Euler's angles $\hat{R}_z(\psi), \hat{R}_y(\theta), \hat{R}_z(\phi)$ Euler's rotation matrices.

It should be noted that with regard to any errors or inconsistencies between this reference information and other information provided herein, that common sense and logic should govern. Accordingly, in some instances, this reference information may be inconsistent with other portions of this disclosure.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for identifying drilling induced fractures while drilling a wellbore into a formation, the method comprising:
   obtaining multi-component induction data collected by a drill string comprising a multi-component induction tool;
   processing the data using multi-frequency focused (MFF) processing to estimate values for formation resistivity in both the X and Y directions; and
   identifying drilling induced fractures when the formation resistivity in the Y direction changes more than the formation resistivity in the X direction changes.

2. The method as in claim 1, wherein the multi-component induction data comprises multi-frequency data.

3. The method as in claim 1, wherein obtaining data comprises obtaining data from a plurality of depths of the wellbore.

4. The method as in claim 1, wherein the formation comprises biaxially anisotropic media.

5. The method as in claim 1, further comprising estimating porosity of a fracture within the formation.

6. The method as in claim 1, further comprising estimating a stability of the wellbore from fracture information.

7. An instrument for identifying drilling induced fractures in a formation surrounding a wellbore, the instrument comprising:
- at least one set of coils adapted for generating a field in the formation, the set further adapted for obtaining multi-component induction data from the field; and
- a processor equipped to process data to estimate using multi-frequency focused (MFF) processing formation resistivity in both the X and Y directions and identify drilling induced fractures when the formation resistivity in the Y direction changes more than the formation resistivity in the X direction changes.

8. The instrument as in claim 7, wherein the set of coils comprises at least one transmitter for generating one of a transverse electric field (TE) and a transverse magnetic field (TM).

9. The instrument as in claim 7, wherein at least a portion of the set of coils is adapted to provide azimuthal sensitivity.

10. A non-transitory computer readable media encoded with a computer program product, the product comprising computer executable instructions for identifying a fracture in a subterranean formation, the instructions comprising instructions for:
- receiving multi-component induction data collected by a multi-component induction tool;
- processing the data using multi-frequency focused (MFF) processing to estimate values for formation resistivity in both the X and Y directions; and
- identifying drilling induced fractures when the formation resistivity in the Y direction changes more than the formation resistivity in the X direction changes.

11. The non-transitory computer readable media as in claim 10, wherein processing further comprises:
- estimating an angle of the formation for each direction of a three-dimensional coordinate system.

* * * * *